(12) United States Patent
Cacciatore et al.

(10) Patent No.: US 6,417,891 B1
(45) Date of Patent: Jul. 9, 2002

(54) COLOR MODIFICATION ON A DIGITAL NONLINEAR EDITING SYSTEM

(75) Inventors: Raymond D. Cacciatore, Westford; Robert Gonsalves, Wellesley, both of MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/293,259

(22) Filed: Apr. 16, 1999

(51) Int. Cl.$^7$ ................................................. H04N 9/64
(52) U.S. Cl. ........................ 348/649; 348/631; 348/708
(58) Field of Search ................................ 348/577, 649, 348/651, 708, 631, 453; 382/162, 167; 345/153, 149, 199; 358/518, 520, 523

(56) References Cited

U.S. PATENT DOCUMENTS

| | | |
|---|---|---|
| 4,189,742 A | 2/1980 | Klopsch |
| 4,272,780 A | 6/1981 | Belmares-Sarabia et al. |
| 4,298,885 A | 11/1981 | Okada ........................ 358/39 |

(List continued on next page.)

FOREIGN PATENT DOCUMENTS

| | | |
|---|---|---|
| EP | 0 205 332 B1 | 10/1990 |
| EP | 0 512 839 A2 | 11/1992 |
| EP | 0 517 035 A2 | 12/1992 |

(List continued on next page.)

OTHER PUBLICATIONS

U.S. application No. 09/293,732, Gonsalves, filed Apr. 16, 1999.

U.S. application No. 09/293,590, Cacciatore et al., filed Apr. 16, 1999.

(List continued on next page.)

*Primary Examiner*—Victor R. Kostak
(74) *Attorney, Agent, or Firm*—Peter J. Gordon

(57) ABSTRACT

A color modification system and method for reducing the number of computations performed on a pixel color. This reduction in computations increases the rate at which color modification may be performed and decreases the effects of rounding errors. Decreasing the effects of rounding errors produces a more accurate color modification, thereby reducing the likelihood of artifacts. The system and method performs color modification on a pixel color, where the color includes a first, second, and third component and each component defines a value of the color. The system includes a chroma lookup table having a plurality of entries. Each entry corresponds to a luma value and contains chroma coefficients. The chroma coefficients define color modifications to be applied to the components of the color. If a luma value is received, the chroma lookup table generates output chroma coefficients at an output. The output coefficients are generated by accessing the entry corresponding to the luma value, and extracting the output coefficients from the entry. The coefficients may include at least four matrix coefficients. The system may include a first matrix multiplier that receives the four matrix coefficients and at least a first and second of the color at an input and generate at least a first modified component and second modified component as output. The first matrix multiplier applies matrix multiplication to the first and second components using the four output chroma coefficients as the coefficients of the matrices. The chroma lookup table may defines a function of luma, and the function may be nonlinear.

22 Claims, 15 Drawing Sheets

U.S. PATENT DOCUMENTS

| | | | | |
|---|---|---|---|---|
| 4,367,465 | A | 1/1983 | Mati et al. | |
| 4,385,311 | A | 5/1983 | Harwood et al. | |
| 4,386,345 | A * | 5/1983 | Narveson et al. | 348/603 |
| 4,410,908 | A | 10/1983 | Belmares-Sarabia et al. | |
| 4,418,358 | A | 11/1983 | Poetsch et al. | |
| 4,488,245 | A | 12/1984 | Dalke et al. | |
| 4,492,978 | A | 1/1985 | Thomas | |
| 4,571,632 | A | 2/1986 | Schaphorst et al. | |
| 4,599,643 | A | 7/1986 | Harlan | 358/74 |
| 4,602,286 | A | 7/1986 | Kellar et al. | |
| 4,642,632 | A | 2/1987 | Ohyagi et al. | |
| 4,642,676 | A | 2/1987 | Weinger | |
| 4,679,067 | A | 7/1987 | Belmares-Sarabia et al. | |
| 4,694,329 | A | 9/1987 | Belmares-Sarabia et al. | |
| 4,698,666 | A | 10/1987 | Lake, Jr. et al. | |
| 4,727,412 | A | 2/1988 | Fearing et al. | |
| 4,733,230 | A | 3/1988 | Kurihara et al. | |
| 4,750,050 | A | 6/1988 | Belmares-Sarabia et al. | |
| 4,763,186 | A | 8/1988 | Belmares-Sarabia et al. | |
| 4,782,397 | A | 11/1988 | Kimoto | |
| 4,794,460 | A * | 12/1988 | Shiota | 358/244 |
| 4,797,733 | A | 1/1989 | Takagi | |
| 4,811,084 | A | 3/1989 | Belmares-Sarabia et al. | |
| 4,823,184 | A | 4/1989 | Belmares-Sarabia et al. | |
| 4,827,344 | A | 5/1989 | Astle et al. | |
| 4,857,994 | A | 8/1989 | Belmares-Sarabia et al. | |
| 4,862,251 | A | 8/1989 | Belmares-Sarabia et al. | |
| 4,866,511 | A | 9/1989 | Belmares-Sarabia et al. | |
| 4,876,589 | A | 10/1989 | Orsburn et al. | |
| 4,907,071 | A | 3/1990 | Belmares-Sarabia et al. | |
| 5,038,206 | A | 8/1991 | Ubukata | |
| 5,070,397 | A | 12/1991 | Wedderburn-Bisshop | 358/22 |
| 5,089,882 | A | 2/1992 | Kaye et al. | |
| 5,129,013 | A | 7/1992 | Holzmann et al. | |
| 5,130,789 | A | 7/1992 | Dobbs et al. | |
| 5,134,688 | A | 7/1992 | Corthout | |
| 5,140,416 | A | 8/1992 | Tinkler | |
| 5,142,273 | A | 8/1992 | Wobermin | |
| 5,146,325 | A | 9/1992 | Ng | |
| 5,153,937 | A | 10/1992 | Wobermin et al. | |
| 5,179,641 | A | 1/1993 | Comins et al. | |
| 5,181,113 | A | 1/1993 | Chang | |
| 5,218,671 | A | 6/1993 | Liao et al. | |
| 5,241,372 | A | 8/1993 | Ohba | |
| 5,253,043 | A | 10/1993 | Gibson | |
| 5,283,651 | A | 2/1994 | Ishizuka | |
| 5,289,295 | A | 2/1994 | Yumiba et al. | |
| 5,313,275 | A | 5/1994 | Daly et al. | |
| 5,317,678 | A | 5/1994 | Okawara et al. | |
| 6,325,449 | B1 | 6/1994 | Burt et al. | |
| 5,373,327 | A | 12/1994 | McGee et al. | |
| 5,381,185 | A | 1/1995 | Ohki et al. | |
| 5,392,385 | A | 2/1995 | Evangelisti et al. | |
| 5,398,123 | A | 3/1995 | Katsuma | |
| 5,418,895 | A | 5/1995 | Lee | |
| 5,420,971 | A | 5/1995 | Westerink et al. | |
| 5,438,651 | A | 8/1995 | Suzuki et al. | |
| 5,444,835 | A | 8/1995 | Turkowski | |
| 5,450,134 | A | 9/1995 | Legate | |
| 5,479,590 | A | 12/1995 | Lin | |
| 5,488,429 | A | 1/1996 | Kojima et al. | |
| 5,488,674 | A | 1/1996 | Burt et al. | |
| 5,506,946 | A | 4/1996 | Bar et al. | |
| 5,510,843 | A | 4/1996 | Keene et al. | |
| 5,510,851 | A * | 4/1996 | Foley et al. | 348/658 |
| 5,532,751 | A | 7/1996 | Lui | |
| 5,557,334 | A | 9/1996 | Legate | |
| 5,557,339 | A | 9/1996 | Dadourian | |
| 5,557,340 | A * | 9/1996 | Millward | 348/627 |
| 5,600,376 | A | 2/1997 | Casavant et al. | |
| 5,611,030 | A | 3/1997 | Stokes | |
| 5,615,324 | A | 3/1997 | Kuboyama | |
| 5,625,421 | A | 4/1997 | Faroudja et al. | |
| 5,630,037 | A | 5/1997 | Schindler | |
| 5,633,687 | A | 5/1997 | Bhayani et al. | |
| 5,636,290 | A * | 6/1997 | Kita et al. | 382/167 |
| 5,638,136 | A | 6/1997 | Kojima et al. | |
| 5,638,138 | A | 6/1997 | Hickman | 348/678 |
| 5,645,884 | A | 7/1997 | Harlow, Jr. et al. | |
| 5,657,094 | A | 8/1997 | Moriwake | 348/578 |
| 5,659,639 | A | 8/1997 | Mahoney et al. | |
| 5,661,525 | A | 8/1997 | Kovacevicet et al. | |
| 5,663,765 | A | 9/1997 | Matsuse et al. | |
| 5,682,443 | A | 10/1997 | Gouch et al. | |
| 5,703,654 | A | 12/1997 | Iizuka | |
| 5,703,659 | A | 12/1997 | Tanaka | |
| 5,715,377 | A | 2/1998 | Fukushima et al. | 395/109 |
| 5,729,360 | A | 3/1998 | Kita et al. | 358/500 |
| 5,745,121 | A | 4/1998 | Politis | |
| 5,754,180 | A | 5/1998 | Kivolowitz et al. | |
| 5,770,299 | A | 6/1998 | Dannenhauer et al. | |
| 5,774,112 | A | 6/1998 | Kasson | 345/153 |
| 5,805,169 | A | 9/1998 | Harada et al. | |
| 5,888,444 | A | 3/1999 | Dannenhauer et al. | |

FOREIGN PATENT DOCUMENTS

| | | |
|---|---|---|
| EP | 0594312 A1 | 4/1994 |
| EP | 0 494 325 B1 | 11/1995 |
| EP | 0702 832 B1 | 3/1996 |
| EP | 0 709 806 A2 | 5/1996 |
| EP | 0871177 A2 | 10/1998 |
| EP | 0 741 492 B1 | 3/1999 |
| GB | 2 312 120 A | 10/1997 |
| GB | 2 312 348 A | 10/1997 |
| WO | WO 94/29868 | 12/1994 |
| WO | WO 96/13807 | 5/1996 |
| WO | WO 97/06631 | 2/1997 |
| WO | WO 97/39452 | 10/1997 |
| WO | WO 98/11510 | 3/1998 |

OTHER PUBLICATIONS

U.S. application No. 09/293,730, Gonsalves et al., filed Apr. 16, 1999.

U.S. application No. 09/392,823, Gonsalves et al., filed Sep. 9, 1999.

U.S. application No. 09/545,644, Cooper et al., filed Apr. 7, 2000.

Alan Wm. Paeth, Distance Approximations and Bounding Polyhedra, copyright© 1995 by Academic Press, Inc., pp 78–87.

James D. Foley and Andries Van Dam, Fundamentals of Interactive Computer Graphics copyright© 1982 by Addison–Wesley Publishing Company, Inc., pp 245–249.

Eric N. Mortensen and William A. Barrett, Intelligent Scissors for Image Composition Computer Graphics Proceedings, Annual Conference Series 1995, Siggraph 95 Conference Proceedings Aug. 6–11, 1995. A publication of ACM SIGGRAPH, pp. 191–198.

Alvy Ray Smith and James F. Blinn, Blue Screen Matting, Computer Graphics Proceedings, Annual Conference Series, 1996, SIGGRAPH 96, New Orleans, Louisiana, Aug. 4–9, 1996, pp 259–268.

* cited by examiner

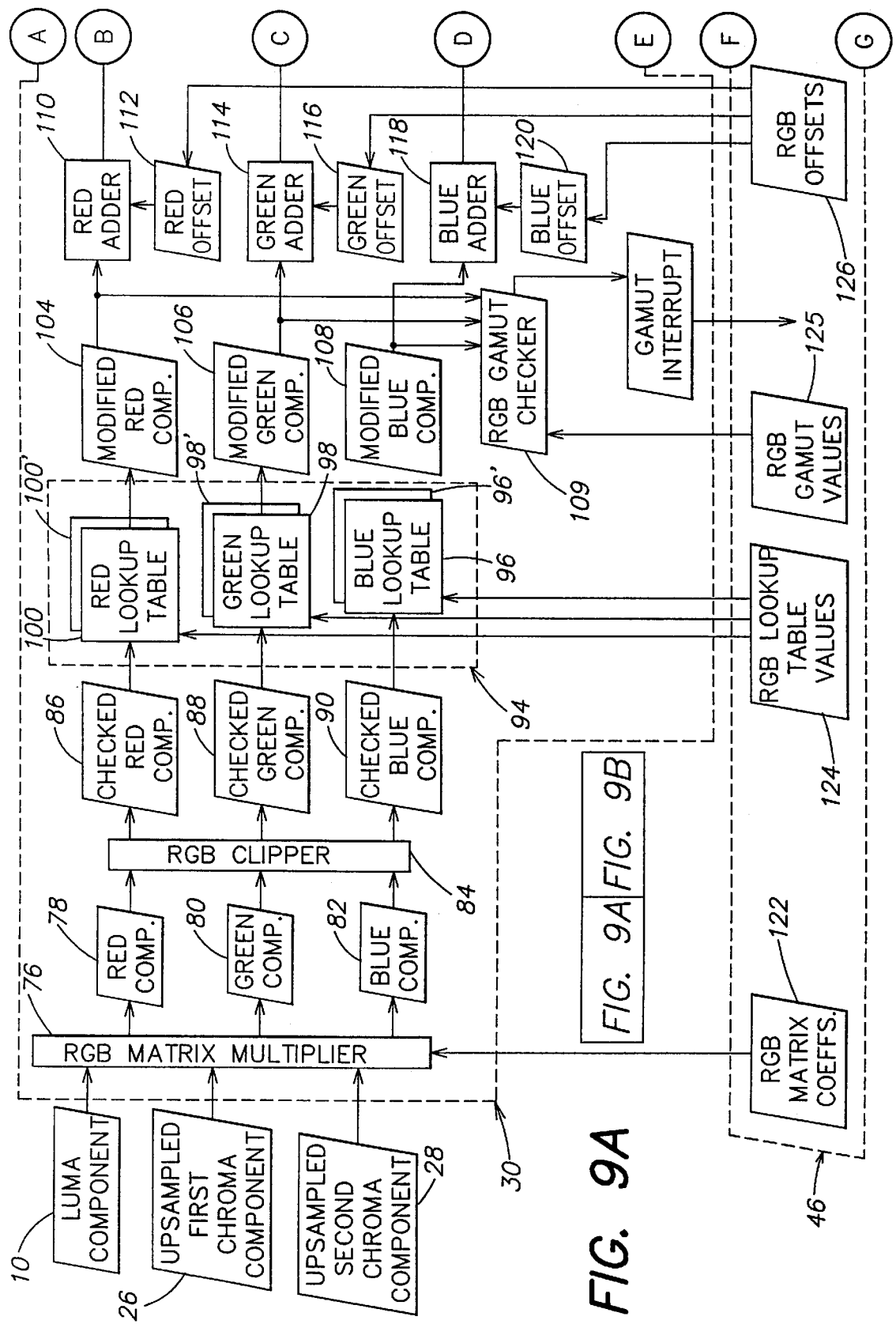

COLOR MODIFICATION ON A DIGITAL NONLINEAR EDITING SYSTEM

BACKGROUND

Digital non-linear editing (DNLE) is a process by which digital media may be edited. DNLE, as the name implies, is performed on digital media stored as data in digital media files on a digital random access medium. DNLE may be conducted in a non-linear fashion because the digital media files in which the digital media is stored can be randomly accessed. Thus an editor may access a piece of the digital media without having to proceed sequentially through other pieces of the digital media stored in the same or other digital media files. More than one editor also may be able to access different pieces of the same digital media contemporaneously. The digital media may be a digitized version of a film or videotape or digital media produced through live capture onto a disk of a graphics or animation software application. Example commercial DNLE systems include the Media Composer® or Symphony video production systems or NewsCutter® news editing system available from Avid Technology, Inc. For a more detailed description of DNLE, see *Digital Nonlinear Editing, New Approaches to Editing Film and Video*, 1993, by Thomas Ohanian.

Color modification is a class of operations that may be performed to correct color errors due to process errors and to adjust the colors used in the video for artistic expression. Such color modifications may include enhancing contrasts or color in an image to give a program an overall "look," or applying special effects to selected segments. Other color modifications may be made by an editor during an editing session to correct problems with color or lighting resulting from the source of the media. Such corrections may include color balancing for camera and lighting differences, correcting for film processing differences, matching colors and tones from shot to shot, or adjusting video levels for differences in source tapes, source decks, etc.

Digital images are comprised of an array of picture elements called pixels. For a given image, color modifications may be applied to all pixels in the image or pixels comprising a portion of the image. In digital video signal processing, a variety of data formats can be used to represent the color of pixels within a digital image. Formats may be classified into two major categories: composite signals and component signals. Component formats represent a color as multiple components, each component defining a value along a dimension of the color space in which the color being represented is defined. A composite video signal is an analog signal that uses a high frequency subcarrier to encode color information. The subcarrier is a sinewave of which the amplitude is modulated by the saturation of the color represented by the signal, and the hue of the color is encoded as a phase difference from a color burst. Analog composite signals are generally used to broadcast television video signals.

There are a variety of component formats used to represent color. RGB (Red, Green, Blue) format represents a color with a red component, a green component and a blue component. CMYK (Cyan, Magenta, Yellow, Black) format represents a color with a cyan component, a magenta component, and a yellow component. CMYK is a format commonly used by printers. The CMYK components are color opposites of RGB components. In a three-dimensional coordinate system, each component of either the RGB or the CMY format represents a value along an axis, the combination of the values defining a cubic color space.

The data formats HSL (Hue, Saturation, Lightness or Luminance) and HSV (Hue, Saturation, Value) represent a color with a hue component, a saturation component, and a luma component. In a three-dimensional coordinate system, the luma component represents a value along a luma axis, the hue component represents the angle of a chroma vector with respect to the luma axis and the saturation component represents the magnitude of the chroma vector. The combination of the values defines a hexagonal cone-shaped color space.

YCrCb, YUV, and YIQ are three formats that represent a color with a luma component Y, and two chroma components, Cr and Cb, U and V, or I and Q, respectively, that define a chroma vector. In a three-dimensional coordinate system, each component of either the YCrCb, YUV, and YIQ format represents a value along an axis, the combination of the values defining a cylindrical color space around the luma axis. The chroma components define the chroma vector. In data formats with a luma component, the luma component can be used independently to represent a pixel in a black and white image to be displayed, for example, with a black and white monitor.

A typical color modification in HSL color space may include increasing a color component or a combination of color components for all pixels in each digital image of a section of digital media. Typically, an editor accesses a segment of a composition that represents the section of media through an editor interface and inputs desired color modifications through the editor interface. Some systems permit an editor to apply color modifications to only portions of a digital image. Portions of a digital image may be specified as one or more pixels or by specifying a region. For example, an editor may select with a mouse, keyboard, or some other editor input device a portion of the image and define color modifications for the selected portion. A suitable commercial system for color modification is Avid Media Illusion™ available from Avid Technology, Inc. The Avid Media Illusion Reference Guide, available from Avid Technology, Inc. is herein incorporated by reference. Other commercial software applications may be used.

Some systems permit an editor to define a color modification as a function of the luma of a pixel. Some systems also allow a user to define functions of luma that allow an editor to define the effect of a color modification over a range of possible luma values of a pixel. For example, an editor may define a highlight function that primarily affects high luma values, a midtone function that primarily affects mid-range luma values, and a shadow function that primarily affects low luma values. The editor may then associate a color modification with each function. If more than one function is defined over a range of luma values, each function, and thus a color modification associated with the function, may have a weighted effect for a given luma value. This weighted effect is defined by the value of the function for the given luma value normalized with respect to the values of functions for the given luma value.

For example, a color modification A is specified for a luma function defined by $X=2L-2$, and a color modification B is specified for a luma function defined by $Y=0.5L+2$. For pixel P with a luma value of 16, $X=30$ and $Y=10$. Normalizing X and Y, the weighted value of X is 0.75 and the weighted value of Y is 0.25. Thus, the color modification applied to pixel P is $Z=0.75A+0.25B$. It should be noted that the equation used in this example is linear to simplify the explanation, but for decreasing and increasing the effect of a color modification for different values of luma, the function is usually non-linear.

The range of possible luma values may have ranges in which one of the functions has a predominant effect. For the highlight, midtone, and shadow functions described above, a highlight range is the range of luma values for which the highlight function has the strongest effect or the greatest weighted value, a midtone range is the range of luma values for which the midtone function has the strongest effect or the greatest weighted value, and the shadow range is the range of luma values for which the shadow function has the strongest effect or the greatest weighted value.

On some DNLE systems, an editor may specify a variety of color modifications to be applied to a digital image or a portion of a digital image. These modifications may be specified in variety of color formats, including RGB, HSL, and composite, and in a variety of units, depending on the interface used by the editor and in a variety of units. Possible units include IRE units in accordance with NTSC standards, millivolts in accordance with PAL standards, percentages, radians, and degrees, and a unit may be represented in integer or real number form. The units and formats for software, hardware, and storage on a color modification may all be different.

Types of color modifications may range from simple offsets and linear functions to complex non-linear functions and color effects defined by an editor, and may be applied to all pixels of a digital image or specified for pixels meeting positional or component-based criteria. For a component color, modifications may be specified for less than all of the components. For example, a color modification may specify that all pixels having a luma value within a certain range receive an increase in saturation depending on the luma value of the pixel. Color modifications may also include combining color components of a component color to produce a modified component or color. Color modifications are described in U.S. patent application entitled "Source Color Modification on a Digital Nonlinear Editing System" (the Gonsalves I application) by Robert Gonsalves and Michael D. Laird filed on even date herewith and in U.S. patent application entitled "Multi-tone Representation of a Digital Image on a Digital Nonlinear Editing System" (the Gonsalves II application), by Robert Gonsalves, filed on even date herewith.

SUMMARY

Because color modifications may be specified in a variety of ways and in a variety of combinations, performing color modifications on an image may include several computations. These computations may consume considerable resources, such as bandwidth and processor time, slowing down the color modification process, and consequently the processing of a video stream. Also, as the number of computations increases, the concatenation of the rounding errors inherent in these computations reduces the accuracy of the modifications applied to a pixel color. This reduction in accuracy may produce undesired artifacts in a digital image.

A color modification system that reduces the number of computations performed for color modifications increases the rate at which color modification may be performed and decreases the effects of rounding errors. Decreasing the effects of rounding errors produces more accurate color modifications, thereby reducing the likelihood of artifacts.

In one aspect, a system performs color modification on a color, where the color including a first, second, and third component. Each component of the color defines a value of the color. The system includes a chroma lookup table having a plurality of entries, each entry corresponding to a luma value and containing chroma coefficients. The chroma coefficients define color modifications to be applied to the components of the color. If a luma value is received, the chroma lookup table generates output chroma coefficients at an output. The chroma coefficients are generated by accessing the entry corresponding to the luma value, and extracting the output coefficients from the entry.

In one embodiment, the chroma coefficients include at least four matrix coefficients, and the system includes a first matrix multiplier that receives the four matrix coefficients and at least a first and second component of the color at an input. The matrix multiplier generates at least a first modified component and second modified component as output by applying matrix multiplication to the first and second components using the four output chroma coefficients as the coefficients of the matrices.

In another embodiment, the chroma lookup table defines a function of luma, where the function may be nonlinear.

BRIEF DESCRIPTION OF THE DRAWINGS

In the drawings,

FIG. 9a is a data flow diagram illustrating a portion of an embodiment of a primary color modifier;

DETAILED DESCRIPTION

The following detailed description should be read in conjunction with the attached drawing in which similar reference numbers indicate similar structures. All references cited herein are hereby expressly incorporated by reference.

The following numerical notation is used to represent binary numbers: (C) I.F, where C (optional) indicates a 2's complement number requiring a sign bit, and absence of the C indicates a magnitude only number. I is a number of integer bits including the sign for 2's complement number, and F is the number of fractional bits.

The color modification described herein uses lookup tables and matrices to reduce the number of computations performed on a pixel color. The lookup tables and matrices simplify the implementation of color modification by providing predefined values representing combinations of color modification functions and conversion factors.

Figure 1:
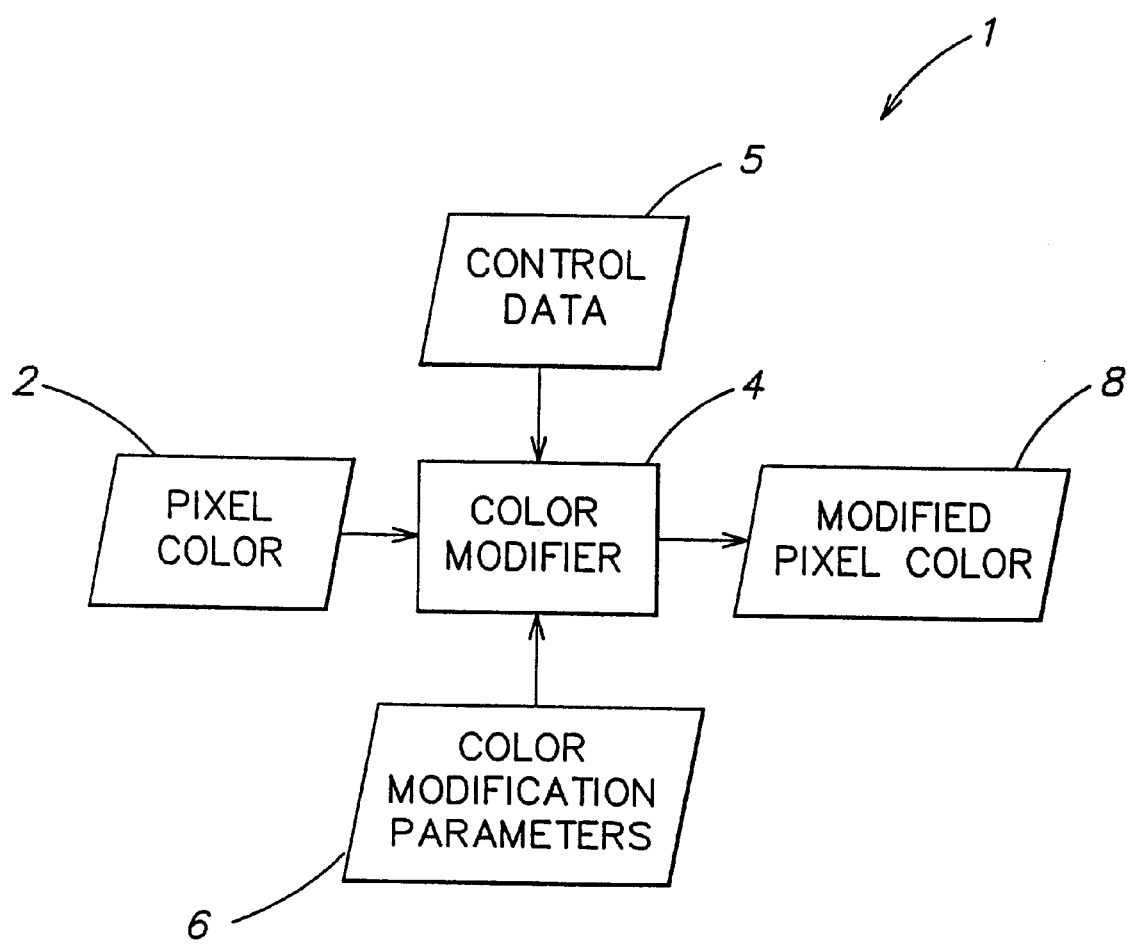
FIG. 1 is a data flow diagram of a color modification system.

FIG. 1 is a data flow diagram illustrating an example embodiment of a color modification system 1. The color modifier 4 receives color modification parameters 6, control data 5, and a pixel color 2 as inputs. The color modifier 4 applies the control data 5 and the color modification parameter 6 to produce a modified pixel color 8.

Figure 2:
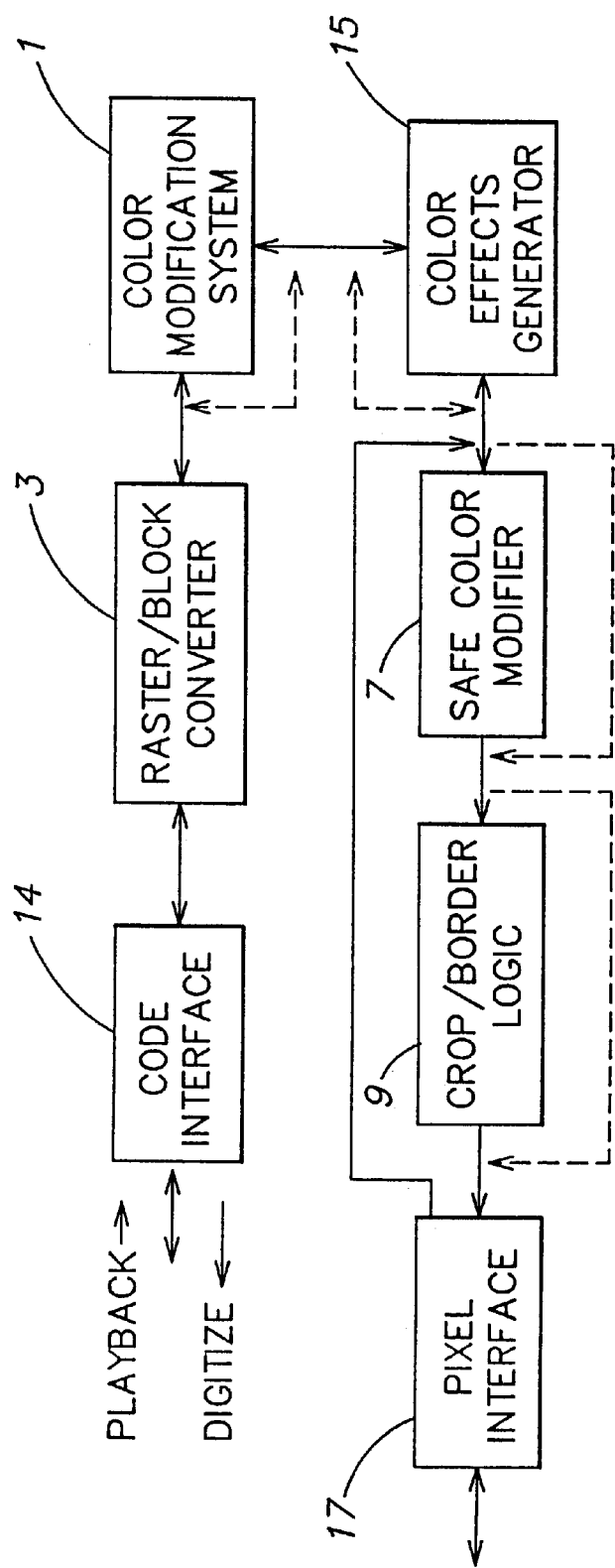
FIG. 2 is a block diagram illustrating an embodiment of a color modification system.

FIG. 2 is a block diagram illustrating an example embodiment of a video production system incorporating the color modification system 1. During playback, a component signal flows from a code interface 14 through a raster/block converter 3, to a color modification system 1, through a color effects generator 15, through a safe color modifier 7, through a crop/border logic 9 and finally to a pixel interface 17. In the digitize direction, the data flows in the reverse direction from the pixel interface 11 to the code interface 14. The arrows in FIG. 2 indicate the direction of data flow, with dotted lines representing the option to bypass a functional block in the data flow path. A suitable system for the playback and digitization of a digital video signal is described in U.S. patent application Ser. No. 09/054,764, entitled "Multistream Switch-Based Video Editing Architecture," by Jeffrey D. Kurtze et al., filed Apr. 3, 1998, U.S. patent application Ser. No. 09/055,073, entitled "A Multi Stream Video Editing System Using Uncompressed Video Data for Real-Time Rendering Performance, and for Non Real Time Rendering Acceleration," by Craig R. Frink et al., filed Apr. 3, 1998, and U.S. patent application Ser. No. 09/054,761, entitled "Computer System and Process for Transferring Multiple High Bandwidth Streams of Data Between Multiple Storage Units and Multiple Applicants in a Scalable and Reliable Manner," by Eric C. Peters et al., filed Apr. 3, 1998. A suitable commercial system for the playback and digitization of a digital video are AirPlay® and Symphony™ from Avid Technology, Inc. of Tewksbury, Massachusetts. A suitable system for implementing the safe color modifier is described in U.S. patent application entitled "Safe Color Limiting Of A Color On A Digital Nonlinear Editing System," by Raymond Cacciatore and Michael Laird filed on even date herewith.

In an example embodiment of color modification, pixels are received as part of a 4:2:2 $YC_bC_r$ video stream. Although $YC_bC_r$ is used to illustrate the color modification system of FIG. 1, the color modification system can be used on other three-component signals, with certain modifications made for component conversion as discussed below.

Figure 3:
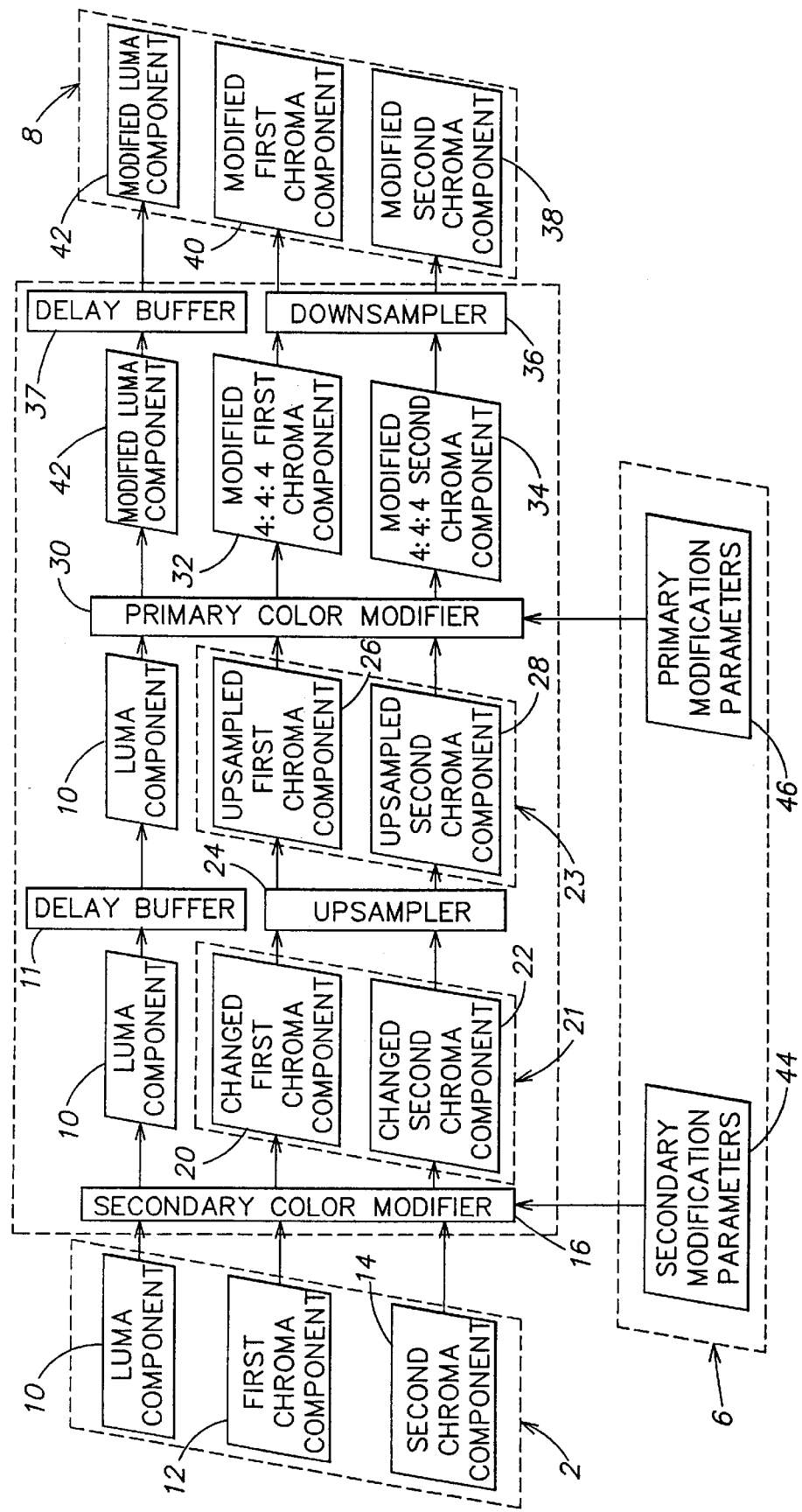
FIG. 3 is a data flow diagram illustrating an embodiment of the color modification system of FIG. 1 in more detail.

FIG. 3 illustrates an embodiment of the color modification system 1 in more detail. A secondary color modifier 16 receives the pixel color 2 as an input. The pixel color 2 includes a luma component 10, a first chroma component 12, and a second chroma component 14. The secondary color modifier 16 also receives secondary modification parameters 44 as an input. The secondary color modifier 16 produces at an output the luma component 10, a changed first chroma component 20 and a changed second chroma component 22. The secondary color modifier 16 is described below in connection to FIG. 4.

An upsampler 24 receives the changed first chroma component 20, and the changed second chroma component 22 as inputs, and produces as output an upsampled first chroma component 26 and an upsampled second chroma component 28. The upsampler 24 is described below in connection with FIG. 7.

A primary color modifier 30 receives the luma component 10, the upsampled first chroma component 26, and the upsampled second chroma component 28 as inputs. The primary color modifier 30 also receives primary modification parameters 46. The primary color modifier 30 produces at an output a modified luma component 42, modified 4:4:4 first chroma component 32, and a modified 4:4:4 second chroma component 34. The primary color modifier 30 is described below in connection to FIGS. 9a and 9b.

A delay buffer 37 receives the modified luma component 42 as an input, and produces the modified luma component 42 delayed at an output. A downsampler 36 receives the modified 4:4:4 first chroma component 32 and the modified 4:4:4 second chroma component 34 as inputs, and produces as outputs a modified first chroma component 40 and a modified second chroma component 38. The downsampler 36 is described below in connection to FIGS. 11a and 11b.

Figure 4:
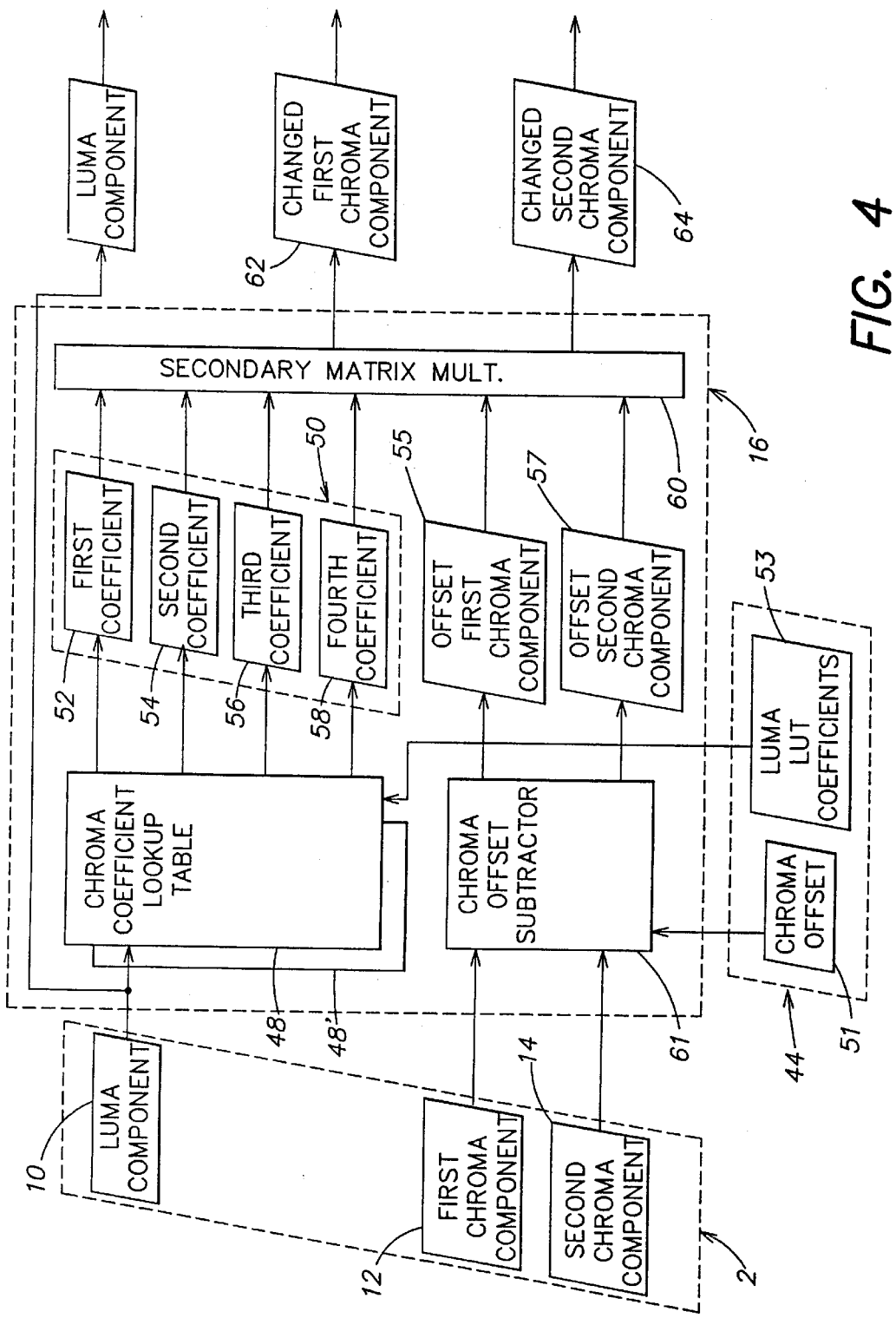
FIG. 4 is a data flow diagram illustrating an embodiment of the secondary color modifier of FIG. 3.

FIG. 4 is a data flow diagram illustrating an embodiment of the secondary color modifier 16. A chroma coefficient lookup table (cc LUT) 48 is loaded with chroma coefficients. The cc LUT receives the luma component 10 as an input, and produces chroma coefficients 50 as outputs. The chroma coefficients 50 include a first coefficient 52, a second coefficient 54, a third coefficient 56, and a fourth coefficient 58. A chroma offset subtractor 61 receives the first chroma component 12 and a second chroma component 14 and a chroma offset 51 as inputs, and produces an offset first chroma component 55 and an offset second chroma component 57 as outputs. 45. A secondary matrix multiplier 60 receives the chroma coefficients 50, the offset first chroma component 55, and the offset second chroma component 57 as inputs. The secondary matrix multiplier 60 generates a changed first chroma component 62 and a changed second chroma component 64 as an output.

Figure 5:
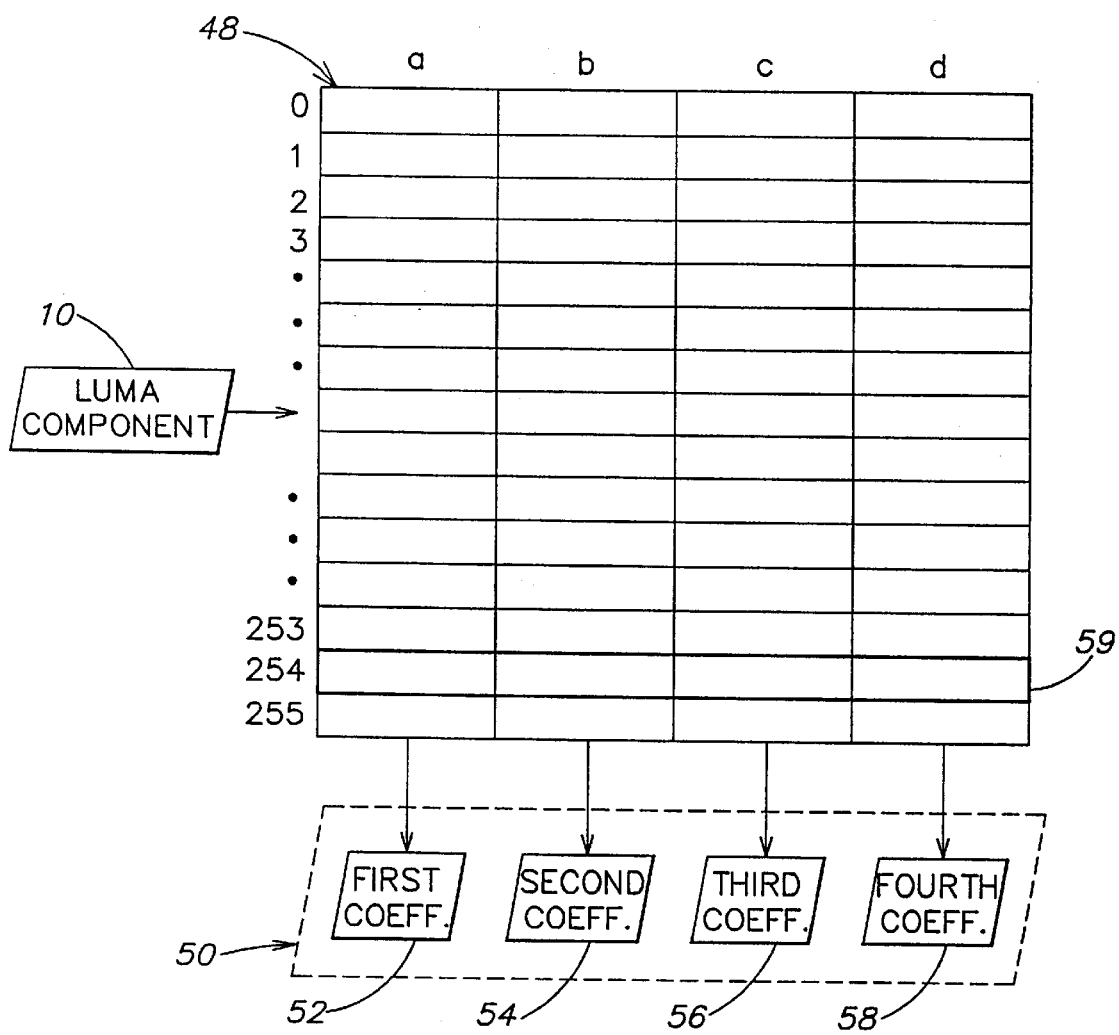
FIG. 5 is a block diagram illustrating an embodiment of a luma look up table.

FIG. 5 is a block diagram showing the cc LUT 48 in more detail. The cc LUT 48 includes a plurality of entries 59. Each entry has four coefficients, illustrated in FIG. 5 as columns a, b, c, and d. The number of entries 59 is determined by the number of possibilities of the luma component 10. The value of the luma component 10 serves as a pointer to the proper entry 59. The coefficients of the entry pointed to by the luma component value are then output and sent to the secondary matrix multiplier.

The function of the cc LUT 48 is to allow color modifications to be performed on the chroma components 12 and 14 based on the value of the luma component 10. The cc LUT coefficients 53 that are loaded into the cc LUT 48 in columns a, b, c, and d of each entry 59 may be defined by a user through a user interface. An example process for defining cc LUT coefficients 53 as functions of a luma component 10 is described in U.S. patent application entitled "Multi-Tone Representation of a Digital Image on a Digital Nonlinear Editing System," by Robert Gonsalves, filed on even date herewith and U.S. patent application entitled "Source Color Modification on a Digital Nonlinear Editing System, by Robert Gonsalves and Michael Laird, filed on even date herewith. A user may define color modifications to be made to chroma components 12 and 14 of the pixel color 2 for a range of luma values as defined by a plurality of luma functions, for example, shadow, midtone, and highlight functions. A user interface may allow a user to define the shadow, midtone, and highlight functions for a range of luma values. The cc LUT coefficients 53 are defined with respect to the luma functions, and these coefficients are stored in the entries 59 for each possible luma component value. For a 601 pixel format, the value of the luma components may be represented with 8 bits, providing a possible luma value in the range from 0–255.

Figure 6:
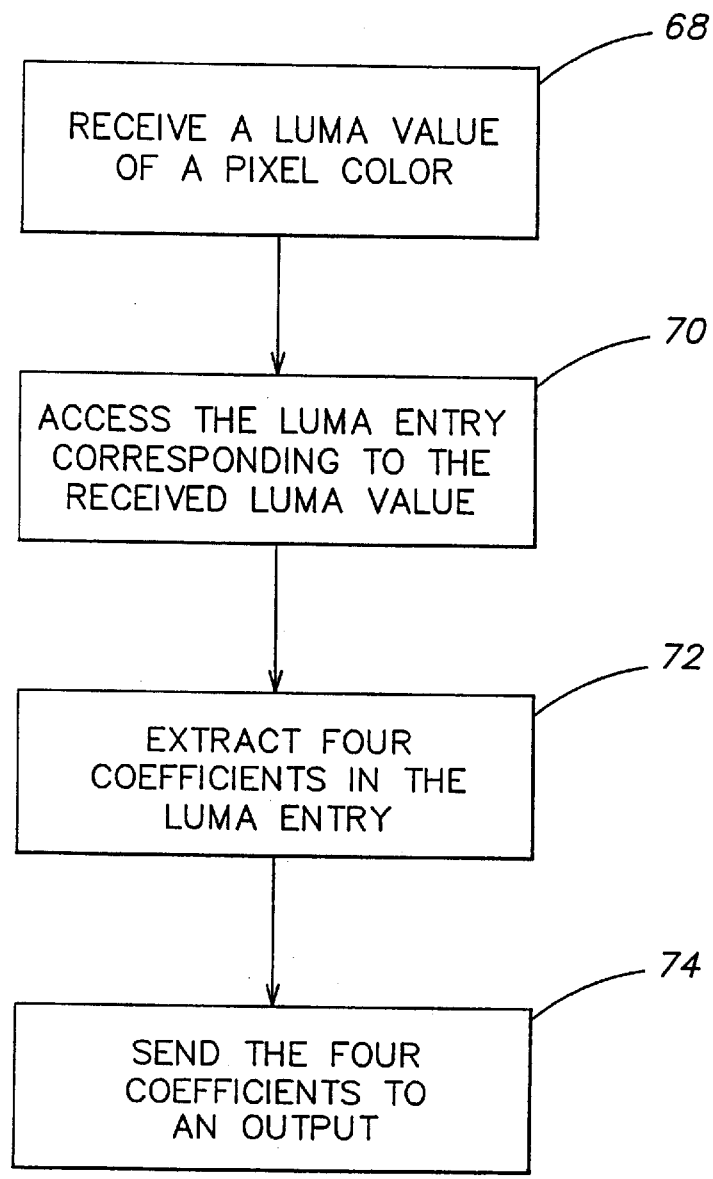
FIG. 6 is a flow chart illustrating an embodiment of a process performed by a luma look up table.

FIG. 6 is a flow chart illustrating an example embodiment of a process performed by the cc LUT 48 or 48'. In step 68, a luma value of a pixel color is received. In steps 70 and 72, the chroma entry corresponding to the received luma value is accessed, and the four coefficients corresponding to the luma entry are extracted. In step 74, the four coefficients are sent to an output.

In an embodiment, the cc LUT 48 is double-buffered as illustrated in FIG. 4 by cc LUT 48'. In another embodiment, both the cc LUTs 48 and 48' have 256 entries, each entry being four coefficients wide, or having 256×8 bytes organized into two side-by-side blocks of RAM, each 256×32. The cc LUTs 48 and 48' may be loaded by an address pointer mechanism, for example, a pointer register. Such a pointer register selects the desired LUT address, and may automatically increment after a write operation occurs to the LUT. This double-buffering of the cc LUT 48 allows cc LUT entries 59 to be changed for an inactive copy 48', for example. The active copy, for example 48, is used to determine coefficients for the luma component 10. Thus the cc LUT 48 may process the luma component 10 while the cc LUT 48' is being loaded. Changing LUT entries may be desired, for example, if it is desired to make changes to the coefficients at boundaries of a video field, for example, if a user wants to add a color effect to a single video frame. In an example embodiment where the pixel color 2 is represented in 601 format, the secondary matrix multiplier performs the following matrix operation:

$$\begin{bmatrix} C_{b'} \\ C_{r'} \end{bmatrix} = \begin{bmatrix} a & b \\ c & d \end{bmatrix} \cdot \begin{bmatrix} C_b \\ C_r \end{bmatrix} \qquad \text{Equation 1}$$

where $C_{b'}$ is the changed first chroma component 62, $C_{r'}$ is the changed second chroma component 64, a is the first coefficient 52, b is the second coefficient 54, c is the third coefficient 56, and d is the fourth coefficient 58. The matrix operation of Equation 1 produces the following equation defining the changed chroma components:

$$C_b' = (a \cdot C_b) + (b \cdot C_r)$$

$$C_{r'} = (C \cdot C_b) + (d \cdot C_r) \qquad \text{Equation 2}$$

The chroma coefficients 50 allow the hue to be changed by changing the angle of a CbCr vector. The chroma saturation may also be adjusted in this matrix, by scaling the magnitude of the CbCr vector.

Figure 7:
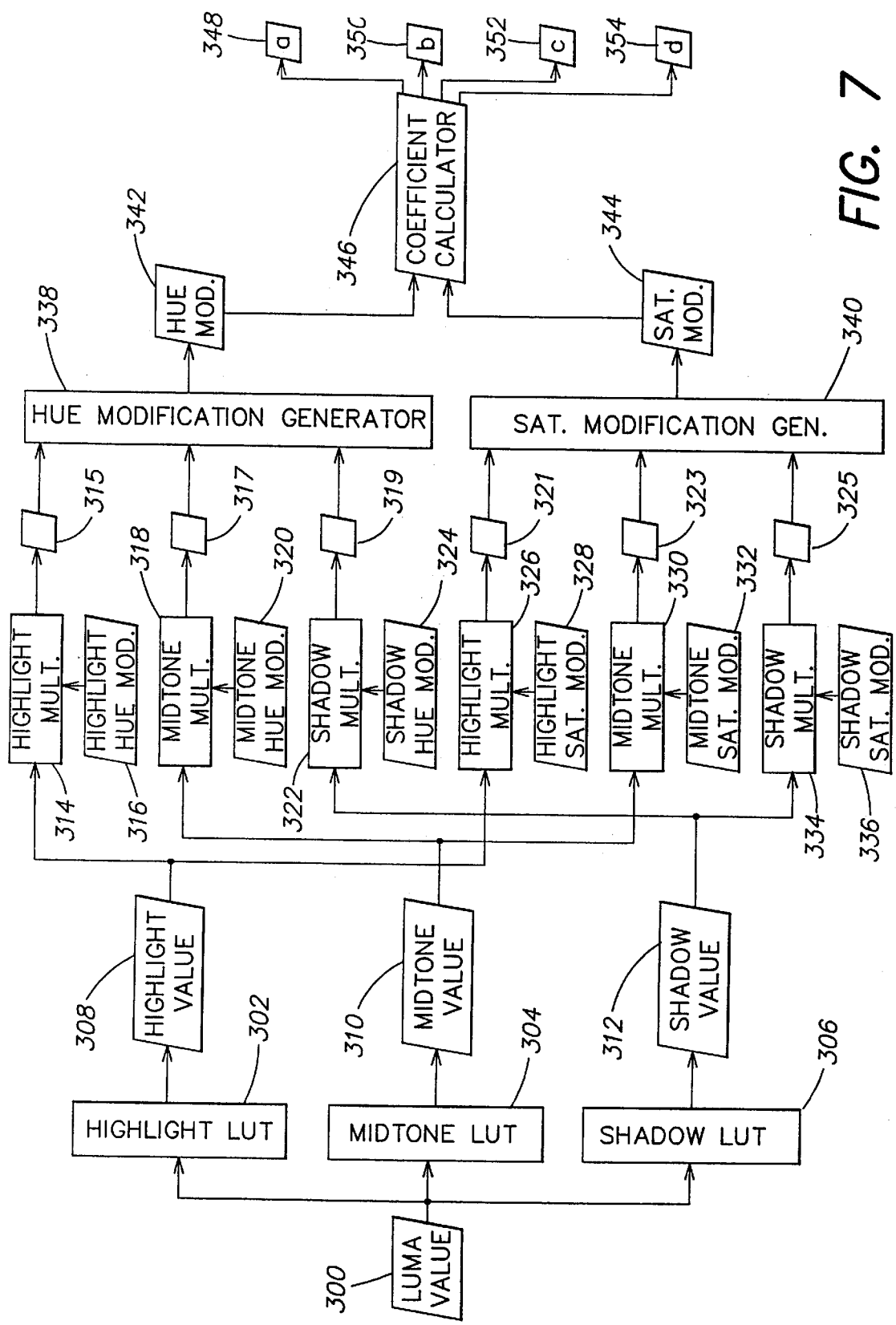
FIG. 7 is a dataflow diagram illustrating an embodiment of a process performed by a coefficient generator.

FIG. 7 is a data flow diagram illustrating an embodiment of a coefficient generator. A highlight LUT 302, a midtone LUT 304 and a shadow LUT 306 receive a luma value 300 and generate a highlight value 308, a midtone value 310, and a shadow value 312, respectively. Each LUT 302, 304 and 306 includes a plurality of entries, each entry representing a luma value in a range of luma values, where each LUT represents a luma function. Such functions are described in a U.S. patent application entitled "Multi-tone Representation of a Digital Image," by Robert Gonsalves, filed on even date herewith. The output values 308, 310 and 312 of these LUTs are values that are weighted relative to each other. In an alternative embodiment, each LUT 302, 304 and 306 may be replaced by a corresponding function. In this alternative embodiment, a luma value is received by the function, and the function generates a weighted value at an output.

For each luma function, a saturation modification and a hue modification are defined. In FIG. 7, these modifications are represented by 316, 320, 324, 328, 332, and 336. As illustrated in FIG. 7, multipliers 314, 318, 322, 326, 330, and 334 receive the outputs from the LUTs, and the respective luma function modifications. The multipliers produce outputs 315, 317, 319, 321, 323, and 325, respectively.

A hue modification generator 338 receives the hue outputs 315, 317, and 319 and generates at an output a hue modification 342. A saturation modification generator 340 receives saturation output 321, 323, and 325 and generates a saturation modification 344. The modification generators 338 and 340 normalize their inputs to produce their outputs 342 and 344, respectively. For example, the hue modification generator 338 adds the hue modification outputs 315, 317, and 319 and divides them by the sum of the highlight value 308, the midtone value 310, and the shadow value 312. The saturation modification generator 340 performs an analogous operation on the saturation modification outputs 321, 323, and 325 to produce the saturation modification 344.

In an example embodiment, if an editor enters the hue modifications 316, 320, and 324 as radians, the hue modification generator 338 performs the additional function of multiplying by Pi ($\pi$) and dividing by 180, thus converting the hue modifications 315, 317, and 319 from radians to a normalized value between 0 and 1. In another embodiment, if the saturation modifications 328, 332, and 336 are entered as percentages, the saturation modification generator 340 additionally divides the sum of the saturation modifications by 100, thereby normalizing the saturation modification 344 as a value between 0 and 1.

The coefficient calculator 346 receives the hue modification 342 and the saturation modification 344 and generates chroma coefficients 348, 350, 352, and 354 to be loaded into the cc LUT 48 for an entry corresponding to the luma value 300. The chroma coefficients are defined by the following equation:

$$a = \cos(\text{hue}) \cdot \text{sat}$$

$$b = \sin(\text{hue}) \cdot \text{sat}$$

$$c = -\sin(\text{hue}) \cdot \text{sat}$$

$$d = \cos(\text{hue}) \cdot \text{sat} \qquad \text{Equation 3}$$

where hue is the hue modification 342, sat is the saturation modification 344, and a, b, c, and d are the luma coefficients 348, 350, 352, and 354, respectively. Substituting equation 3 into equation 2 provides the following:

$$C_{b'} = (Cb \cdot \cos(\text{hue}) \cdot \text{sat}) + (Cr \cdot (-\sin(\text{hue})) \cdot \text{sat})$$

$$C_{r'} = (Cb \cdot \cos(\text{hue}) \cdot \text{sat}) + (Cr \cdot \sin(\text{hue}) \cdot \text{sat}) \qquad \text{Equation 4}$$

Hue defines the angle, e.g., in degrees by which to rotate the $C_b C_r$ vector. In the hardware embodiment of the color modification system, 13 bits of fraction are specified in the matrix coefficients, allowing the vector angle to be changed in increments of one degree. The saturation component of the matrix coefficients scales the magnitude of the $YC_b C_r$ vector. Three bits of integer, plus 13 bits of fraction, allow a range of coefficients of +3.999877929 to −4.0. The output of the secondary matrix multiplier in this example embodiment are in C12.13 format.

In an embodiment of the color modification system, video data is input to the color modifier 4 in 4:2:2 sampling format, for example, the 4:2:2 $YC_bC_r$ format. Before 4:2:2 pixel data can be converted to RGB, it is converted to 4:4:4 sampling space, which includes generation of the odd chroma components. This conversions may be performed by a simple linear interpolation as described below in connection to FIG. 8. The upsampler 24 of FIG. 3 may apply linear interpolation using the following equation to produce the odd luma components:

$$C_n = \frac{C_{n-1} + C_{n+1}}{2} \qquad \text{Equation 5}$$

where $C_n$ is an odd chroma component, $C_{n-1}$ is the preceding even chroma component, and $C_{n+1}$ is the next even chroma component. Either of these even chroma components may be one of the changed chroma components 21 of FIG. 3.

Figure 8:
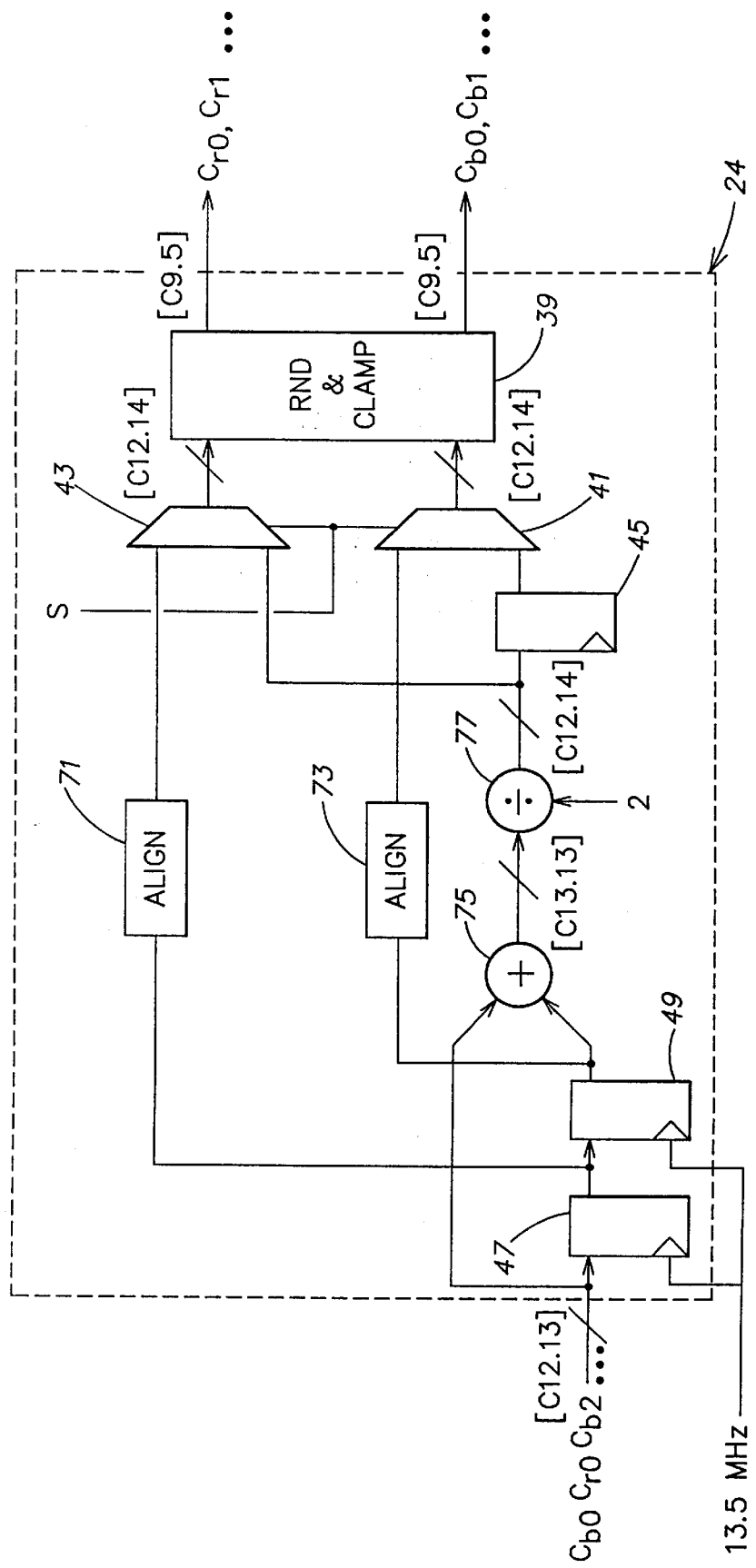
FIG. 8 is a block diagram illustrating an embodiment of an upsampler.

FIG. 8 is a circuit diagram illustrating an example embodiment of the upsampler 24. The even chroma components $C_{b0}C_{r0}C_{b2}$ ... are received as an input of the upsampler 24. The luma component 10 (not shown) may be delayed through pipeline registers, which may serve as the delay buffer 11 of FIG. 3. An adder 75 alternately adds $C_{bn}+C_{b(n+2)}$ and $C_{rn}+C_{r(n+2)}$ after the chroma components have passed through shift registers 47 and 49. The shift registers 47 and 49 may be clocked by a 3.5 megahertz clock, which is the standard sampling frequency of a $YC_bC_r$ signal. The inputs to the adder 75 may be two C12.13-bit values and the output of the adder 75 may be in C13.13 format. The output of the adder 75 is received as an input of the divide-by-2 circuit 77. The divide-by-2 circuit 77 produces a C 12.14 bit output. The output of the divide-by-2 circuit 77 is connected to the input of shift register 45 and multiplexer 43.

The output of shift register 47 is connected to the input of shift register 49 and the input of align circuit 71. The output of shift register 49 is connected to an input of align circuit 73. Each of the align circuits 71 and 73 adds a zero as a least significant fractional bit to the C12.13 input that it receives to produce a C 12.14 formatted output. Multiplexer 43 is connected at an input to the output of the align circuit 71 and the output of the divide by 2 circuit 77. The multiplexer 43 also receives a select input S and outputs data in C12.14 format. The multiplexer 41 is connected at an input to align circuit 73 and the output of shift register 45. The multiplexer 41 is also controlled by the select input S, and outputs data in C12.14 format. A round and clamp circuit 39 is connected at a first input to the output of multiplexer 43 and at second input to the output of multiplexer 41. The round and clamp circuit 39 produces the outputs of the upsampler 24, the upsampled chroma components 23, in C9.5 format. The select input S controls both the multiplexers 41 and 43 to each alternate between selecting even chroma components or the interpolated value produced by the combination of the adder 75 and the divide-by-2 circuit 77. Although in the embodiment of the upsampler 24 described above, linear interpolation is used to upsample the components, other types of interpolation may be used.

The round and clamp circuit 39 rounds its input values from C12.14 format to C12.5 format and clips these values to C9.5 format. The round and clamp circuit 39 uses even rounding. In even rounding, if the value to the right of the rounding point is greater than 0.5 or equal to 0.5, the value to the left of the rounding point is rounded up only if the rounding up will result in an even valve to the left of the rounding point. If rounding up will result in an odd value to the left of the rounding point, the rounding up will not be performed. This even rounding function causes the rounding error distribution to be symmetric about zero.

Figure 9B:
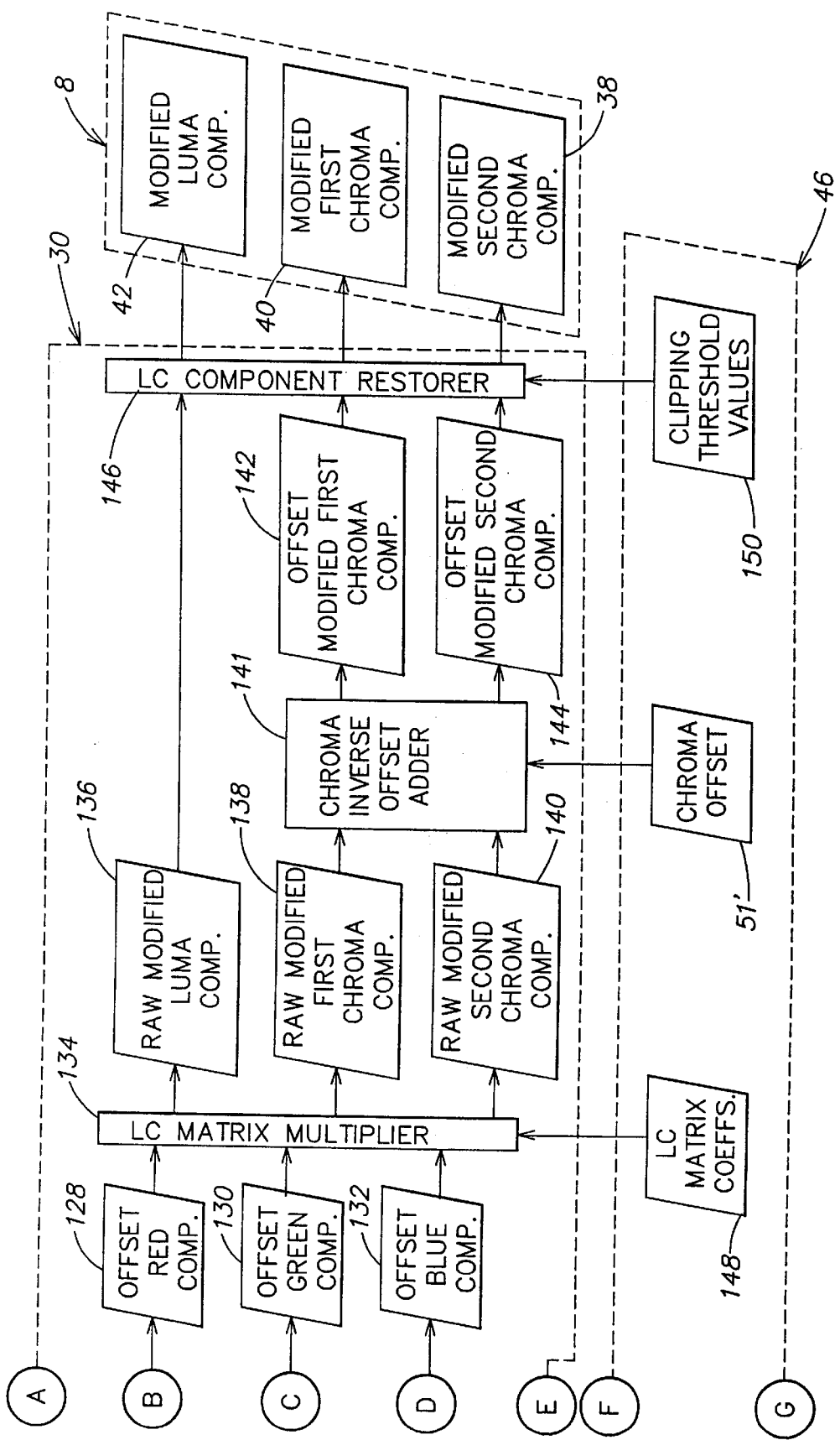
FIG. 9b is a data flow diagram illustrating a portion of an embodiment of a primary color modifier.
Figure 10:
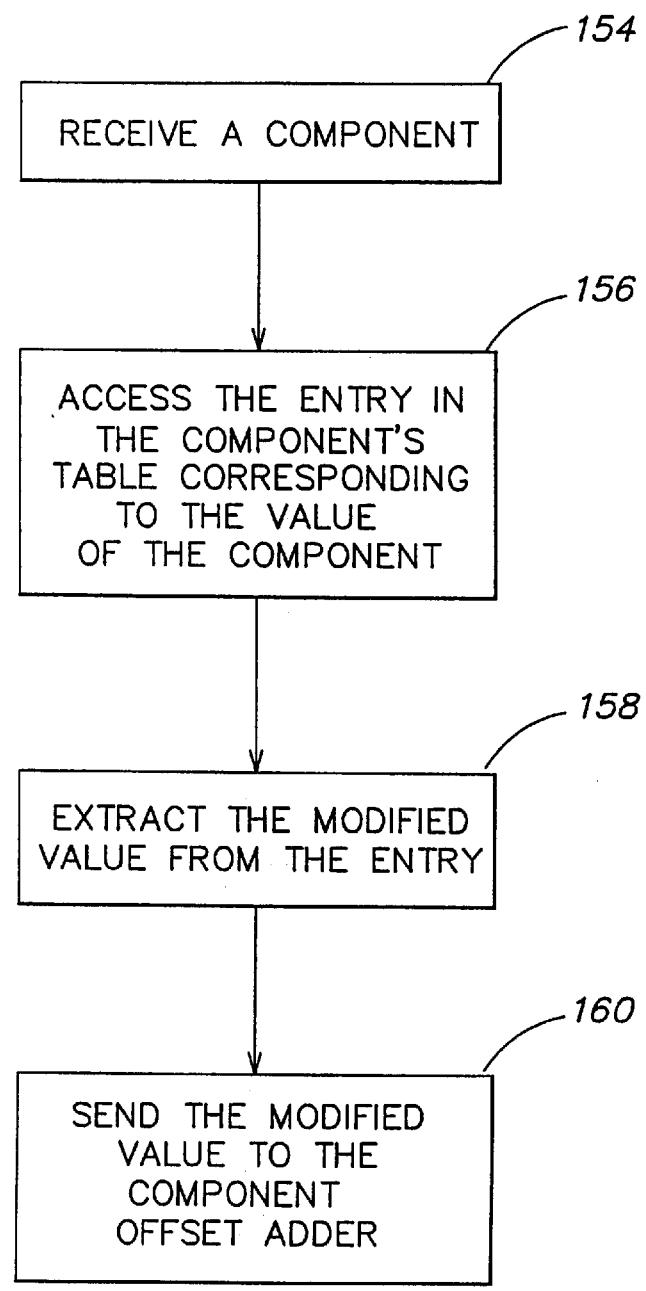
FIG. 10 is a flow chart illustrating an embodiment of a process performed by a RGB lookup table.

FIGS. 9a and 9b are a data flow diagram illustrating an embodiment of the primary color modifier 30. An RGB matrix multiplier 76 receives the luma component 10, the upsampled first chroma component 26 and the upsampled second chroma component 28 as inputs. The RGB multiplier also receives RGB matrix coefficients 122. The RGB matrix coefficients 122 are applied to the inputs of the RGB multiplier 76 to produce a red component 78, a green component 80 and a blue component 82. An RGB clipper 84 receives the red component 78, the green component 80, and the blue component 82 as inputs. The RGB clipper clips the red, green, or blue component if the component represents a chroma value outside a predefined chroma range, and outputs a checked red component 86, a checked green component 88, and a checked blue component 90.

RGB LUTs 94, including red LUT 100, green LUT 98, and blue LUT 96 are loaded with RGB lookup table values 124. The RGB LUTs 94 receive the checked red component 86, the checked green component 88, and the checked blue component 90, access the corresponding entries in the red LUT 100, the green LUT 98, and the blue LUT 96, respectively, and generate a modified red component 104, a modified green component 106, and a modified blue component 108 respectively.

A red adder 110 receives the modified red component 104 and a red offset 112, and produces as an output an offset red component 128. A green adder 114 receives the modified green component 106 and a green offset 116 and produces an offset green component 130 as an output. A blue adder 118 receives the modified blue component 108 and a blue offset 120 at an input and produces an offset blue component 132 as an output.

LC (Luma/Chroma) matrix multiplier 134 receives the offset red component 128, the offset green component 130, and the offset blue component 132 as inputs. The LC matrix multiplier 134 also receives LC matrix coefficients 148 which it applies to the inputs to produce as outputs a raw modified luma component 136, a raw modified first chroma component 138 and a raw modified second chroma component 140.

A chroma inverse offset adder 141 receives the raw modified first chroma component 138 and the raw modified second chroma component 140, and applies a chroma offset 51' to produce as outputs an offset modified first chroma component 142 and an offset modified second chroma component 144. The chroma offset 51' is the mathematical negative of the chroma offset 51 in FIG. 4.

An LC component restorer 146 receives the offset modified first chroma component 142 and the offset modified second chroma component 144 as inputs. The LC component restorer 146 also receives clipping threshold values 150 and applies these threshold values to the inputs to produce as outputs the modified luma component 42, the modified first chroma component 40, and the modified second chroma component 38.

The RGB matrix multiplier 76 operates on the luma and chroma components that it receives and transforms these values into RGB color space, and performs a number of other color operations. In another embodiment, the inputs are already in RGB color space and, therefore, the RGB matrix multiplier 76 performs the color operations, but does not transform the values into RGB color space.

The operation performed by the RGB matrix multiplier 76 on its inputs is defined by the following equation 6:

$$\begin{bmatrix} R \\ G \\ B \end{bmatrix} = \begin{bmatrix} a & b & c & d \\ e & f & g & h \\ i & j & k & l \end{bmatrix} \cdot \begin{bmatrix} Y \\ Cb \\ Cr \\ 1 \end{bmatrix} \qquad \text{Equation 6}$$

where R is the red component 78, G is the green component 80, B is the blue component 82, a-1 are the RGB matrix coefficients 122, Y is the luma component 10, $C_b$ is the upsampled first chroma component 26, and $C_r$ is the upsampled second chroma component 28. The values from the application of the matrices of Equation 6 for the red component 78, the green component 80, and the blue component 82 are defined by the following equation:

$R = aY + bC_b + cC_r + d$ $G = eY + fC_b + gC_r + h$ $B = iY + jC_b + kC_r + l$      Equation 7

Each of the RGB matrix coefficients 122, a-l, can be identified with the color modification functions that they affect. Matrix 1 below represents how each RGB matrix coefficients 122, may be identified with a specific function.

$$\begin{bmatrix} \text{contrast, cs} & \text{cs} & \text{cs} & \text{tint, brightness} \\ \text{contrast, cs} & \text{saturation, hue, cs} & \text{saturation, hue, cs} & \text{tint, brightness} \\ \text{contrast, cs} & \text{saturation, hue, cs} & \text{saturation, hue, cs} & \text{tint, brightness} \end{bmatrix} \qquad \text{Matrix 1}$$

where cs refers to color space conversion. Similar to the secondary matrix multiplier 60, the RGB matrix multiplier can provide saturation and hue adjustments, but as a "master" control, as opposed to defining color changes to be applied for specific luminance values.

In an example embodiment, the first three columns of coefficients in the RGB matrix are in C5.10 format, and the last column of RGB matrix coefficients are in C10.0 format. The reasons for the C5.10 format of the coefficients of the first three columns in the example embodiment are as follows. The largest input value represented by the bits of the luma component 10 and the upsampled chroma components 26 and 28 is 255. The smallest fraction that causes a 1-bit change when multiplied by the largest input is 1/256, which can be represented with 8 bits. Since the matrix operation uses three such multiplication products to be added together, using an additional 2 bits of fraction avoids rounding errors in the final result. Therefore, a total of 10 fraction bits are used. For the sole purpose of color space conversion, the coefficient values are less than 2.0. However, four bits of integer allow saturation to be multiplied by a factor of greater than 8 and contrast to be multiplied by factors up to 16.

In the example embodiments, the reasons for the data format of the fourth column of the RGB matrix, which deals with tint and brightness, are as follows. Nine bits of integer allow an offset of +/−512 to be added to the luma and chroma components 10, 26, and 28 in order to adjust the tint and brightness of the pixel. These fourth column coefficients also may be used to add an offset to the data used by the RGB LUTs 94. The offset may be used for the following purposes. The input values of the RGB LUTs 94, for example, the red component 78, the green component 80, and the blue component 82, are positive values because these input values are used as addresses into the memory.

The RGB conversion matrix, the possible negative values of the chroma components 26 and 28, and hue rotation all may cause one of the RGB values, 78, 80 and 82, to become negative. For RGB conversion alone, the red range is −175–431, the green range is −133–388, and blue is −221–478. These ranges are outside the normal 0–255 range for 8-bit components; however, clipping the values here would truncate the range of the modified components 38, 40, 42 resulting from the final conversion to $YC_bC_r$. Therefore, if the range of a component extends into negative values, an offset is incorporated into the fourth column of the RGB matrix such that each component has a range greater than 0.

Furthermore, as contrast, saturation, hue, tint, and brightness effects are defined through a user interface, the range of each of the RGB matrix coefficients 122 is re-computed such that the offset is properly adjusted. For example, if $YC_bC_r$ values are converted to RGB using the standard ITU-R BT.601 conversion matrix, allowing for a full 0–255 range for the $YC_bC_r$ component, the resulting red component may have any value in the range −175–431. In order to preserve the full range of red components, an offset of 175 is added to the red, shifting its range to 0–606. This range now fits entirely within the range of 0–1023 that can be handled by the 10-bit LUTs.

In an embodiment, the RGB matrix multiplier 76 yields a 31-bit result: 15-bits integer, 15-bits fraction, and a sign bit. The final value is rounded off to an integer value, using even rounding. As described above, in the absence of contrast, saturation, tint, and brightness effects, the overall output range of the RGB components is 0–700, and the conversion back to $Yc_bC_r$ maps the components back to within the 0–255 range. However, saturation and contrast multiplication factors may bring the component outside of the legal ranges. For this reason, the RGB clipper 84 may always clip the RGB components 78, 80, 82 to within the 0–1023 range that can be accepted by the LUTs. Further clipping can be performed by programming the RGB LUTs 94.

In an example embodiment, further resolution can be gained in the RGB LUT operations where the component range is less than 1024. The color components 78, 80, and 82 may be scaled by adjusting the RGB matrix coefficients 122 such that the component range extends from 0–1023. The inverse operation may be applied by the LC matrix multiplier 134 to de-scale the RGB components.

Generally, the RGB LUTs 96, 98 and 100 operate in similar fashion to the luma LUT engine 53. For example, the red LUT 100 receives checked red component 86 instead of a luma component 10, and produces a modified red component 104 instead of coefficients 50.

The three RGB LUTs 96, 98, and 100 allow non-linear functions to be performed on the checked red component 86, the checked green component 88, and the checked blue component 90, respectively. Performing the color space conversion function alone through the RGB matrix multiplier 76 can result in RGB components 86. 88 and 90 with values greater than the 0–255 range usually expected, without even considering modifications to the contrast, saturation, tint, and brightness.

In an example embodiment of the RGB LUTs 94, to encompass the full range of value for the RGB components 86, 88, and 90, each LUT comprises 1024 locations, each with a width of 10 bits. As with the cc LUT 48, each of the RGB LUTs, 100, 98, and 96 is double-buffered so that one copy of each LUT may be updated while the other copy is in use. The RGB LUTs 94 may be loaded using an address pointing mechanism such as that described with respect to the luma LUT. In an example embodiment of the primary color modifier, the address pointer is a register whose value is used to select a specific address within one of the LUTs 94. Similar to the luma LUT tables 48 and 48', a status bit is maintained in a register to indicate which copy of an RGB LUT, 100 or 100', 98 or 98', or 96 or 96' respectively, is the current active copy. After a write operation to a LUT has been performed, the pointer register is incremented. When accessing the RGB LUTs 94, the 30 least-significant bits are valid.

It is possible for the modified RGB components 104, 106, and 108, to have color values and RGB space that exceed the normal 8-bit component range. In an embodiment, an RGB gamut checker 109 identifies components 104, 106, and 108 that exceed the 8-bit component range, or a range defined by RGB gamut values 125, and may warn a system user that video components are present which exceed specified range. Although components that exceed a specified range may eventually produce valid $YC_bC_r$ values after passing through the remaining data path of the primary color modifier, the RGB gamut checker provides a mechanism by which a user can be warned that certain RGB components before being converted back to $Yc_rC_b$ format are out of the RGB gamut range. Thus, the RGB gamut checker receives the modified RGB components 104, 106, and 108 and the RGB gamut values that define the upper and lower limit for the RGB values. The RGB gamut checker then may produce a gamut interrupt or event if one of the components 104, 106, or 108 falls outside of the RGB gamut region.

After the RGB data is modified by the RGB LUT engine 94, the offset that was applied as part of the fourth column of the RGB matrix coefficients 122 is removed by the red, green, and blue adders 110, 114, and 118, respectively. The adders 110, 114, and 118 receive a red offset 112, a green offset 1 16, and a blue offset 120, which are offset values defined to remove the offset applied by the fourth column of the;RGB matrix coefficients 122. In another embodiment, the red, green and blue offsets 112, 116, and 120 respectively, can be a value other than a value defined to remove the offset applied by the RGB matrix coefficients 122.

In an embodiment, the RGB offsets 126 may be incorporated into the RGB LUT values 124. However, applying the RGB offsets 126 as a separate operation, as opposed to factoring the RGB offsets 126 into the RGB lookup table values 124, saves a bit in each of the LUT memories, and simplifies computations by keeping the LUT range adjustments. In an embodiment of the primary color modifier 30, the RGB offsets 126 are a 2s complement integer of the form C9.0.

The LC matrix multiplier 134 is similar to the RGB matrix multiplier 76. The values of the LC matrix coefficients 148, however, incorporate contrast, hue, saturation, tint, and brightness color modifications. The LC matrix multiplier 134 applies matrix multiplication defined by equation 8:

$$\begin{bmatrix} Y \\ Cb \\ Cr \end{bmatrix} = \begin{bmatrix} a & b & c & d \\ e & f & g & h \\ i & j & k & l \end{bmatrix} \cdot \begin{bmatrix} R \\ G \\ B \\ 1 \end{bmatrix} \qquad \text{Equation 8}$$

where Y is the raw modified luma component 136, $C_b$ is the raw modified first chroma component 138, $C_r$ is the raw modified second chroma component 140, R is the offset red component 128, G is the offset green component 130, B is the offset blue component 132, and a-1 are the LC matrix coefficients 148. The matrix multiplication defined by equation 7 results in the following equation defining the values of the raw modified luma component 136, the raw modified first chroma component 138, and the raw modified second chroma second component 140:

$$Y = aR + bG + cB + d$$

$$C_b = eR + fG + gB + h$$

$$C_r = iR + jG + kB + l \qquad \text{Equation 9}$$

The matrix coefficients 148, a-l affect the color modification functions of contrast, hue, saturation, tint, and brightness controls as represented by the following matrix 2.

$$\begin{bmatrix} \text{contrast,} & & \text{tint, brightness} \\ \text{contrast,} & \text{saturation, hue, tint, brightness} \\ \text{contrast,} & \text{saturation, hue, tint, brightness} \end{bmatrix} \qquad \text{Matrix 2}$$

In an embodiment of the primary color modifier 30, the offset components 128, 130, and 132 are 10-bits in width with a sign bit. The LC matrix coefficients a-l have more bits of fractional precision than the RGB matrix coefficients 122 because of the greater range of the offset components 128, 130, and 132. These two more bits result in the first three columns of the LC matrix being defined by coefficients with the data format C4.12, with the coefficients of the fourth column having the data format C11.0.

The chroma inverse offset adder 141 reverses the effect of the chroma offset adder 59 of the secondary color modifier 16, by adding a chroma offset 51', which is the mathematical negative of the chroma offset 51. For an example embodiment where the pixel color is in $YC_bC_r$ format, the chroma offset 51 is 128, and therefore the chroma offset 51' is 128 also, except it is added by the chroma inverse offset adder to the raw modified chroma components 138 and 140, as opposed to the subtraction produced by the chroma offset subtractor 61.

In an example embodiment of the primary color modifier 30, the final outputs from the matrix multiplier, numbers of the form C17.12, are rounded, again using even rounding, and are then clamped to 8-bits. For example, the C17.12 value is rounded to a C17.0 value, and then clamped to an 8.0 data format.

Figure 11A:
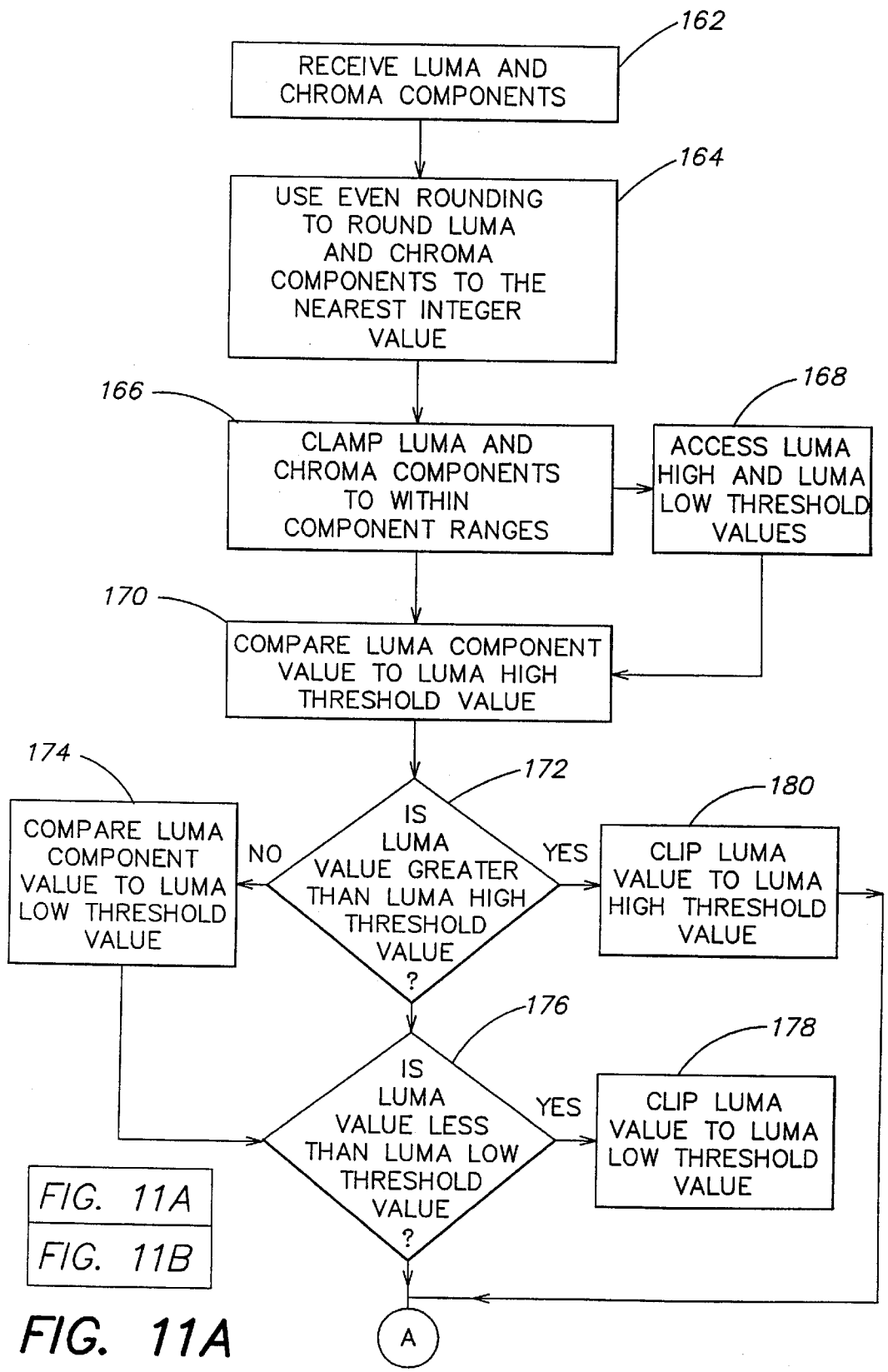
FIG. 11a is a portion of a flow chart illustrating an embodiment of a process performed by a luma/chroma component restorer.
Figure 11B:
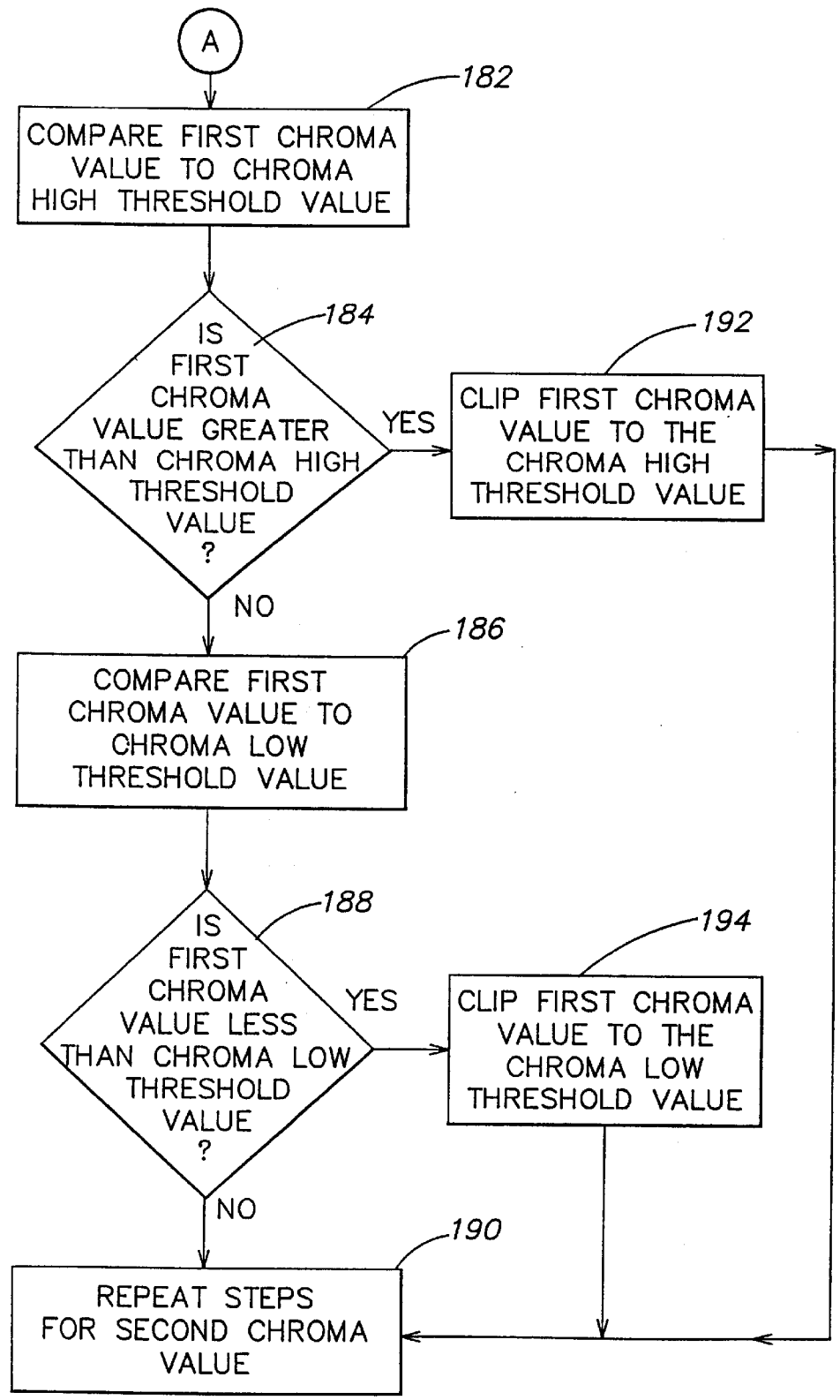
FIG. 11b is a portion of a flow chart illustrating an embodiment of a process performed by a luma/chroma component restorer.

FIGS. 11A and 11B are flowcharts illustrating an example embodiment of a process performed by the LC component restorer 146. In step 162, luma and chroma components 136, 142, and 144 are received. Next in step 164, even rounding is used to round the luma and chroma components to the nearest integer value. Next in the step 166, the luma and chroma components are clamped to be within the 8-bit component range. In step 168, the clipping threshold value 50, luma high and luma low threshold values, are accessed.

In step 170, the luma component value is compared to the luma high threshold value. In step 172, if it is determined that the component luma value is greater than the luma high threshold value, then the luma values is clipped to the luma high threshold value in step 180. If it is determined in step 172 that the component luma value is not greater than the luma high threshold value, then in step 174 the luma component value is compared to the luma low threshold value. If it is determined that the luma value is less than the luma low threshold value in step 176, then the luma value is clipped to the luma low threshold value.

After steps 176, 178 or 180 are processed, in the step 182 a first chroma value is compared to a chroma high threshold value. If it is determined in 184 that the first chroma value is greater than the chroma high threshold value, then in step 192 the first chroma value is clipped to the chroma high threshold value. If it is determined in step 184 that the first chroma value is not greater than the chroma high threshold value, then in step 186 the first chroma value is compared to the chroma low threshold value. If in step 188 it is determined that the first chroma value is less than the chroma low threshold value, then in step 194 the first chroma value is clipped to the chroma low threshold value.

After steps 188, 192 or 194, steps 162 through 194 are repeated for the second chroma component (Step 190). It should be understood that steps 162–194 may be performed on the first and second chroma components in any order or in parallel.

For an example embodiment, where the final video output is to be in 4:2:2 sampling format, the modified chroma components, 38 and 40, are downsampled. For properly bandlimited video, downsampling involves dropping the chroma components of the odd pixels. However, the secondary and primary color modifier 16 and 30, respectively, and the non-linear color effects implemented through the RGB LUT engine 94, performed in 4:4:4 sampling format, can introduce out-of-band components into the video stream. A downsampler 36 may be used to apply a filter to the modified 4:4:4 chroma components 32 and 34. Filtering may be accomplished for each chroma component of an even pixel by generating a weighted average combining the even component and its adjacent odd chroma components.

Figure 12A:
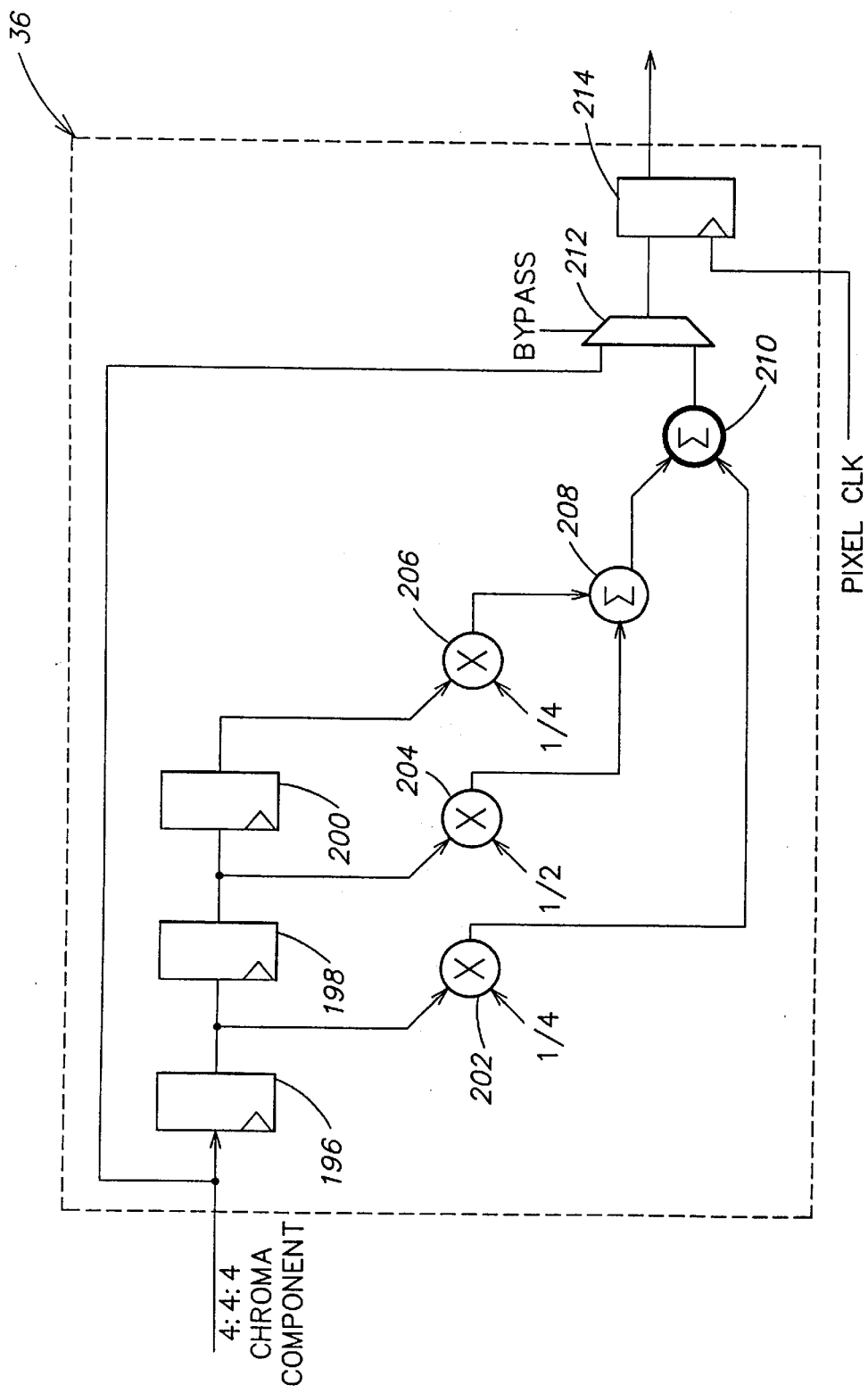
FIG. 12a is a circuit diagram illustrating an embodiment of a downsampler.

FIG. 12A is a circuit diagram illustrating an embodiment of the downsampler 36. A first shift register 196 receives a 4:4:4 chroma component 32 or 34. The first shift register 196 is connected at an output to the input of a second shift register 198 and a first input of a first multiplier 202. The second register 198 is connected at an output to an input of the third register 200 and a first input of the second multiplier 204. The third shift register 200 is connected at an output to a first input of a third multiplier 206.

The first multiplier 202 receives at a second input the value of 0.25 and is connected at an output to the input of a first adder 210. The second input of the second adder 204 receives the value 0.50, and is connected at an output to a second adder 208. The third multiplication circuit 206 receives at a second input the value .250, and is connected at an output to a second input of the second adder 208, which is connected at an output to a second input of the first adder 210.

The first adder 210 is connected at an output to the input of a multiplexer 212. The multiplexer 212 receives at a second input a 4:4:4 chroma component 32 or 34. The multiplexer 212 also has a bypass control input and is connected at an output to a fourth shift register 214. The fourth shift register 214 is controlled by a pixel clock input, and produces at an output a 4:2:2 chroma component signal. The downsampler 36 may execute the following equation:

$$C_n = \tfrac{1}{4}C_{n-1} + \tfrac{1}{2}C_n + \tfrac{1}{4}C_{n+1}$$  Equation 10:

where $C_n$ is a component of a pixel.

Figure 12B:
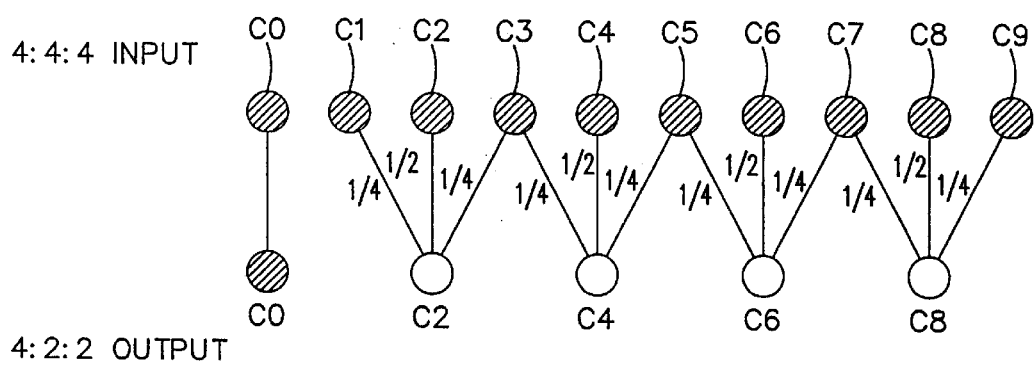
FIG. 12b is a block diagram illustrating an embodiment of an operation performed by a downsampler.

FIG. 12B illustrates how the downsampler 36 takes a 4:4:4 input signal C0, C1, C2, C3, C4, C5, C6, C7, C8, C9 and produces a 4:2:2 output signal C0, C2, C4, C6, C8. In FIG. 12B, a first chroma component of a line of a video field is passed directly to the output, unfiltered. In the example embodiment of the downsampler described in connection with FIG. 12A, this direct passing, of C0 for example, is controlled by the bypass control signal controlling the multiplexer 212. The first chroma component of a line of a video field, for example C0, is bypassed because there is no preceding chroma component of an odd pixel to use to produce a weighted average. Although in the embodiment of the downsampler 36 described above, a linear 3-tap filter is used to downsample the components, other forms of filtering may be used.

Color modification may be performed on a general purpose computer system but is not limited by the specific computer described herein. Many other different machines may be used to implement the invention. Although the foregoing description sets forth an example of a circuit for implementing color modification, one alternative implementation is a computer program executed on a general purpose computer system. Such a suitable computer system includes a processing unit which performs a variety of functions and a manner well-known in the art in response to instructions provided from an application program. The processing unit functions according to a program known as the operating system, of which many types are known in the art. The steps of an application program are typically provided in random access memory (RAM) in machine-readable form because programs are typically stored on a non-volatile memory, such as a hard disk or floppy disk. When an editor selects an application program, it is loaded from the hard disk to the RAM, and the processing unit proceeds through the sequence of instructions of the application program.

The computer system also includes an editor input/output (I/O) interface. The editor interface typically includes a display apparatus (not shown), such as a cathode-ray-tube (CRT) display in an input device (not shown), such as a keyboard or mouse. A variety of other known input and output devices may be used, such as speech generation and recognition units, audio output devices, etc.

The computer system also may include a video and audio data I/O subsystem. Such a subsystem is well-known in the art and the present invention is not limited to the specific subsystem described herein. The audio portion of such a subsystem includes an analog-to-digital (A/D) converter (not shown), which receives analog audio information and converts it to digital information. The digital information may be compressed using known compression systems, for storage on the hard disk to use at another time. A typical video portion of such a subsystem includes a video image compressor/decompressor (not shown) of which many are known in the art. Such compressor/decompressors convert analog video information into compressed digital information. The compressed digital information may be stored on hard disk for use at a later time. An example of such a compressor/decompressor is described in U.S. Pat. No. 5,355,450. Video data also may remain uncompressed.

It should be understood that one or more output devices may be connected to the computer system. Example output devices include a cathode ray tube (CRT) display, liquid crystal displays (LCD) and other video output devices, printers, communication devices such as a modem, storage devices such as disk or tape, and audio output. It should also be understood that one or more input devices may be connected to the computer system. Example input devices include a keyboard, keypad, track ball, mouse, pen and tablet, communication device, and data input devices such as audio and video capture devices and sensors. It should be understood that color modification is not limited to the particular input or output devices used in combination with the computer system or to those described herein.

The computer system may be a general purpose computer system which is programmable using a computer programming language, such as "C++," JAVA or other language, such as a scripting language or even assembly language. The computer system may also be specially programmed with special purpose hardware such as an application specific integrated circuit (ASIC). In a general purpose computer system, the processor is typically a commercially available processor, such as the series x86 and Pentium processors, available from Intel, similar devices from AMD and Cyrix, the 680X0 series microprocessors available from Motorola, and the PowerPC microprocessor from IBM. Many other processors are available. Such a microprocessor executes a program called an operating system, of which WindowsNT, Windows95 or 98, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. It should also be understood that the invention is not limited to a particular memory system.

Such a system may be implemented in software or hardware or firmware, or a combination of the three. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

It should be understood that the computer system is not limited to a particular computer platform, particular processor, or particular programming language. Additionally, the computer system may be a multi-processor computer system or may include multiple computers connected over a computer network. It should be understood that each step of FIGS. 6, 10, 11*a*, and 11*b* may be separate modules of a computer program, or may be separate computer programs. Such modules may be operable on separate computers.

Having now described some embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A system for performing color modification on a color, the color including a first, second and third component, each component defining a value of the color, the system comprising:

a chroma lookup table having a plurality of entries, each entry corresponding to a luma value and containing chroma coefficients, the chroma coefficients defining color modifications to be applied to the components of the color, wherein, if a first luma value is received, the chroma lookup table generates output chroma coefficients at an output by accessing an entry of the lookup table corresponding to the first luma value and extracting the output coefficients from the entry; and a first matrix multiplier that receives the output chroma coefficients and at least the first and the second of the components of the color at an input and generates at least a first modified component and second modified component as output, the first matrix multiplier applying matrix multiplication to the first and second components using the output chroma coefficients as coefficients of a matrix.

2. A system for modifying a color defined by at least a first component, a second component and a third component, the system comprising:

a parameter lookup table including a plurality of entries, wherein each entry corresponds to a value of luma and includes one or more color modification parameters defined for the value of luma to be applied to at least one component corresponding to the color other than a luma component corresponding to the color, wherein the parameter lookup table further includes an input to receive a luma value corresponding to the color, logic to access an entry of the plurality of entries, wherein the accessed entry corresponds to the received luma value, and one or more outputs to output the one or more color modification parameters included in the entry, wherein the color modification parameters included in the parameter lookup table are based on one or more functions of luma, wherein at least one of the functions is user-defined, and the system further comprises a user interface having one or more inputs to receive user input from which the at least one user-defined function is generated, one or more luma lookup tables, each luma lookup table defining one of the one or more functions of luma and including a plurality of entries, each entry corresponding to a value of luma and including an output value for the luma value; and a color modification generator having one or more inputs to receive the output values from the one or more luma lookup tables and having one or more outputs to output the color modification parameters to the parameter lookup table, the color modification generator operative to generate the color modification parameters from the output values.

3. A system for modifying a color defined by at least a first component, a second component and a third component, the system comprising:

a parameter lookup table including a plurality of entries, wherein each entry corresponds to a value of luma and includes one or more color modification parameters defined for the value of luma to be applied to at least one component corresponding to the color other than a luma component corresponding to the color, wherein the parameter lookup table further includes an input to receive a luma value corresponding to the color, logic to access an entry of the plurality of entries, wherein the accessed entry corresponds to the received luma value, and one or more outputs to output the one or more color modification parameters included in the entry, and a first matrix multiplier having one or more inputs to receive the one or more output color modification parameters and the at least one component, logic to modify the at least one component to produce at least one modified component by applying matrix multiplication to the at least one component using the one or more output color modification parameters as one or more coefficients of a first matrix, and one or more outputs to output the at least one modified component.

4. The system of claim 3, further comprising:

a second matrix multiplier having one or more inputs to receive the at least one modified component and second-matrix coefficients, logic to apply matrix multiplication to the at least one component using the second-matrix coefficients as coefficients of a second matrix to produce a red component, a blue component, and a green component, and one or more outputs to output the red component, the blue component and the green component.

5. The system of claim 4, further comprising:

an RGB lookup table including a plurality of entries, each entry corresponding to a value of an input RGB component and including a modified RGB component specifying a predefined value resulting from the application of a user-defined function to the value corresponding to the entry, the input RGB component being one of the red, green, or blue color components, wherein the RGB lookup table further includes an input to receive the input RGB component, logic to generate at least one modified RGB component by accessing an entry of the RGB table corresponding to the input RGB component and extracting the modified RGB component included therein, and one or more outputs to output the at least one modified RGB component.

6. The system of claim 5, further comprising:

a third matrix multiplier including one or more inputs to receive the at least one modified RGB component and third-matrix coefficients, logic to generate at least one modified component corresponding to the color by applying matrix multiplication to the at least one modified RGB component using the third-matrix coefficients as coefficients of a third matrix, and one or more outputs to output the at least one modified component corresponding to the color.

7. A method of modifying a color using a color modification system, the color defined by at least a first, second and third component and the system including a parameter lookup table including a plurality of entries, wherein each entry corresponds to a value of luma and includes one or more color modification parameters defined for the value of luma to be applied to at least one component corresponding to the color other than a luma component corresponding to the color, the method comprising:

receiving a luma value corresponding to the color;

determining color modification parameters to modify the color by accessing an entry in the coefficient lookup table corresponding to the received luma value, wherein the color modification parameters included in the parameter lookup table are based on one or more functions of luma, wherein at least one of the functions is user-defined according to user input received through a user interface; and wherein the color modification system further includes one or more lookup tables, each luma lookup table defining one of the one or more functions of luma and including a plurality of entries, each entry corresponding to a value of luma and including an output value for the luma value, the method further comprising:

accessing the output values from the one or more luma lookup, tables; and generating the color modification parameters for the parameter lookup table from the output values of the one or more luma lookup tables.

8. A method of modifying a color using a color modification system, the color defined by at least a first, second and third component and the system including a parameter lookup table including a plurality of entries, wherein each entry corresponds to a value of luma and includes one or more color modification parameters defined for the value of luma to be applied to at least one component corresponding to the color other than a luma component corresponding to the color, the method comprising:

receiving. a luma value corresponding to the color;

determining color modification parameters to modify the color by accessing an entry in the coefficient lookup table corresponding to the received luma value; and applying matrix multiplication to the at least one component using the determined color modification parameters as coefficients of a first matrix to produce at least one modified component.

9. The method of claim 8, further comprising:

receiving second-matrix coefficients corresponding to user-defined color modifications; and generating one or more RGB components by applying matrix multiplication to the at least one modified component using the second-matrix coefficients as coefficients of a second matrix.

10. The method of claim 9, wherein the color modification system further comprises an RGB lookup table having a plurality of entries, each entry corresponding to a value of an RGB component and including a modified RGB component specifying a predefined value resulting from the application of a user-defined function to the value corresponding to the entry, the method further comprising:

for at least one of the generated RGB color components, generating at least one modified RGB component as output by accessing an entry of the RGB lookup table corresponding to the at least one RGB component and extracting the modified RGB component included therein.

11. The method of claim 10, further comprising:

receiving third-matrix coefficients corresponding to user-defined color modifications; and generating at least one modified component corresponding to the color by applying matrix multiplication to at least the modified RGB component using the third-matrix coefficients as coefficients of a third matrix.

12. A system for performing color modification on a digital image including a plurality of pixels, each pixel defined by at least a first, second and third component, the system comprising:

a user interface including one or more inputs to receive one or more user-defined color modifications to apply to the digital image, wherein each color modification is specified for a function of luma; and a color modifier including a parameter lookup table to store modification parameters generated from the one or more color modifications, one or more inputs to receive at least one component corresponding to a pixel of the digital image other than a luma component corresponding to the pixel, and logic to apply the parameter lookup table to the at least one component to produce a modified pixel as output, wherein the modified pixel defines at least a portion of a modified version of the digital image.

13. The system of claim 12, wherein the parameter lookup table has a plurality of entries, each entry corresponding to a value of luma and including one or more of the modification parameters, wherein the one or more modification parameters are specified for the value of luma corresponding to the entry.

14. The system of claim 13, wherein the color modifier further comprises logic to extract the one or more modification parameters from an entry of the parameter lookup table that corresponds to a value of the luma component corresponding to the pixel and an output to output the extracted one or more modification parameters.

15. The system of claim 14, the color modifier further comprising:

a matrix multiplier including one or more first inputs to receive the extracted modification parameters, one or more second inputs to receive the at least one component of the pixel, logic to apply matrix multiplication to the at least one component using the extracted modification parameters as coefficients of a matrix to produce the modified pixel as output.

16. The system of claim 12, further comprising:

a modification parameter generator to receive the one or more user-defined color modifications as input and to generate the one or more modification parameters as output.

17. A method of performing color modification on a digital image including a plurality of pixels, each pixel defined by at least a first, second and third component, using a color modification system comprising a user interface and a parameter lookup table, the method comprising:

receiving one or more user-defined color modifications through the user interface to apply to a digital image, wherein each color modification is specified for a function of luma;

storing modification parameters generated from the one or more color modifications in the parameter lookup table;

receiving at least one component corresponding to a pixel of the digital image other than a luma component corresponding to the pixel; and applying the parameter lookup table to the at least one component to produce a modified pixel as output, wherein the modified pixel defines at least a portion of a modified version of the digital image.

18. The method of claim 17, wherein the parameter lookup table has a plurality of entries, each entry corresponding to a value of luma and including one or more of the modification parameters, wherein the one or more modification parameters are specified for the value of luma corresponding to the entry.

19. The method of claim 18, further comprising, in response to receiving the luma component, extracting the one or more modification parameters from an entry of the parameter lookup table corresponding to the luma component that corresponds to the pixel.

20. The method of claim 19, the step of applying the one or more modification parameters comprising:

applying matrix multiplication to the at least one component of the pixel using the one or more extracted modification parameters as coefficients of the matrix.

21. The method of claim 17, further comprising:

generating the modification parameters from the one or more user-defined color modifications.

22. An apparatus for modifying a color defined by a first component, a second component and a third component, the apparatus comprising:

a parameter lookup table including a plurality of entries, each entry corresponding to a value of luma and including one or more modification parameters specified for the value;

one or more first inputs connected to the parameter lookup table to load the color modification parameters into the entries of the parameter lookup table, the color modifications derived from one or more functions of luma;

a second input connected to the parameter lookup table to receive a luma value corresponding to the color; and one or more outputs connected to the parameter lookup table for outputting at least one modified component corresponding to the color, the at least one modified component generated by applying the parameter lookup table to at least one component corresponding to the color other than a luma component corresponding to the color.

* * * * *